(12) United States Patent
Li et al.

(10) Patent No.: US 8,585,829 B2
(45) Date of Patent: *Nov. 19, 2013

(54) SOIL RESISTANT FLOOR CLEANER

(75) Inventors: Minyu Li, Oakdale, MN (US);
Catherine Hanson, Hastings, MN (US);
Kim R. Smith, Woodbury, MN (US);
Robert D. Hei, Baldwin, WI (US);
Robert Crowley, Greensboro, NC (US);
Traci Gioino, Maplewood, MN (US);
Andrew Steven Wold, Wayzata, MN (US); Mark D. Levitt, Lake Elmo, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,930

(22) Filed: Nov. 28, 2011

(65) Prior Publication Data

US 2012/0149623 A1    Jun. 14, 2012

Related U.S. Application Data

(60) Provisional application No. 61/422,373, filed on Dec. 13, 2010, provisional application No. 61/422,376, filed on Dec. 13, 2010.

(51) Int. Cl.
*B08B 3/04* (2006.01)
*C11D 9/00* (2006.01)

(52) U.S. Cl.
USPC ............. 134/25.1; 134/25.2; 134/39; 134/40; 134/42; 510/199; 510/214; 510/238; 510/239; 510/240; 510/434; 510/437; 510/474; 510/475; 510/477

(58) Field of Classification Search
USPC ......... 510/199, 214, 238, 239, 240, 434, 437, 510/474, 475, 477; 134/25.1, 25.2, 39, 40, 134/42
See application file for complete search history.

(56) References Cited

U.S. PATENT DOCUMENTS

| | | | |
|---|---|---|---|
| 2,674,619 A | 4/1954 | Lundsted | |
| 2,677,700 A | 5/1954 | Jackson et al. | |
| 2,903,486 A | 9/1959 | Brown et al. | |
| 2,972,592 A | 2/1961 | Brown et al. | |
| 3,048,548 A | 8/1962 | Martin et al. | |
| 3,308,078 A | 3/1967 | Rogers et al. | |
| 3,382,178 A | 5/1968 | Lissant et al. | |
| 3,574,124 A | 4/1971 | Lyness et al. | |
| 3,664,961 A | 5/1972 | Norris | |
| 3,785,860 A | 1/1974 | Zdanowski | |
| 3,793,275 A | 2/1974 | Corey et al. | |
| 3,917,552 A | 11/1975 | Bischoff et al. | |
| 3,929,678 A | 12/1975 | Laughlin et al. | |
| 4,017,662 A | 4/1977 | Gehman et al. | |
| 4,363,756 A | 12/1982 | Sepulveda et al. | |
| 4,565,647 A | 1/1986 | Llenado | |
| 4,613,679 A | 9/1986 | Mainord | |
| 4,725,319 A | 2/1988 | Osberghaus | |
| 4,869,934 A | 9/1989 | Jethwa | |
| 4,877,691 A | 10/1989 | Cockrell, Jr. | |
| 4,909,962 A | 3/1990 | Clark | |
| 5,137,793 A | 8/1992 | Cockrell, Jr. | |
| 5,290,954 A | 3/1994 | Roberts et al. | |
| 5,407,700 A | 4/1995 | Man et al. | |
| 5,458,532 A | 10/1995 | Cannone | |
| 5,460,887 A | 10/1995 | Pechhold | |
| 5,534,184 A | 7/1996 | Underwood | |
| 5,605,493 A | 2/1997 | Donatelli et al. | |
| 5,683,143 A | 11/1997 | Peterson et al. | |
| 5,707,708 A | 1/1998 | Pechhold | |
| 5,753,604 A | 5/1998 | Soldanski et al. | |
| 5,834,088 A | 11/1998 | Pechhold | |
| 5,945,472 A | 8/1999 | Duong et al. | |
| 6,180,592 B1 | 1/2001 | Smith et al. | |
| 6,223,383 B1 | 5/2001 | VanPutten | |
| 6,234,886 B1 | 5/2001 | Rivard et al. | |
| 6,261,164 B1 | 7/2001 | Rivard et al. | |
| 6,326,344 B1 | 12/2001 | Levitt | |
| 6,403,546 B1 | 6/2002 | Hernandez et al. | |
| 6,701,940 B2 | 3/2004 | Tsibouklis et al. | |
| 7,033,258 B2 | 4/2006 | Jordan | |
| 7,132,479 B2 | 11/2006 | Engelhardt et al. | |
| 7,204,745 B2 | 4/2007 | Thysell | |

(Continued)

FOREIGN PATENT DOCUMENTS

EP    0449509 B1    10/1991
EP    0458591 B1    11/1991

(Continued)

OTHER PUBLICATIONS

Chen, Wei et al., "Ultrahydrophobic and Ultralyophobic Surfaces: Some Comments and Examples", langmuir, Apr. 24, 1999, 15 (10), pp. 3395-3399. http://pub.acs.org.proxy.lib.uiowa.edu/doi/full/1 0.1 021/1 a990074s, [retrieved on Aug. 24, 2011].
Clyde Hygiene Company, Norfresh Concentrated Floor Maintainer, printed Jan. 2, 2008, 2 pages.
Floor Safety Products, Copyright © 2006 Xtreme Traction, 3 pages.
Floortop Floor Cleaner & Maintainer, Concentrated cleaner for cleaning and maintenance of hard floors, www.pgprof.com, 1 page.
Friction™ Slip Resistant Cleaner & Polish, Nu-Safe Floor Solutions, Inc., printed Oct. 5, 2004, 1 page.
GreenerDesign Staff, "Purdue Scientists Develop 'Self-Cleaning' Coatings that Repel Oil", GreenerDesign Staff, Created Aug. 18, 2009; http://www.greenbiz.com/prinU270n, 2 pages, [retrieved on Aug. 20, 2010].
Howarter, John A. et al., "Amphiphile grafted membranes for the separation of oil-in-water dispersions", Journal of Colloid and Interface Science 329 (2009) 127-132 (published online Oct. 1, 2008).

(Continued)

*Primary Examiner* — Brian P Mruk
(74) *Attorney, Agent, or Firm* — Andrew D. Sorenson; Amy J. Hoffman

(57) ABSTRACT

A cleaning composition includes a fatty acid salt constituting up to about 50% by weight of the composition, an anti-slip agent constituting up to about 20% by weight of the composition, a soil resistant agent constituting up to about 20% by weight of the composition and water. Methods of cleaning coated and uncoated surfaces, and particularly stone surfaces, are also provided.

28 Claims, No Drawings

(56) References Cited

U.S. PATENT DOCUMENTS

| | | | |
|---|---|---|---|
| 7,465,774 B1 | 12/2008 | Schade et al. | |
| 7,550,199 B2 | 6/2009 | Hopkins et al. | |
| 7,655,609 B2 | 2/2010 | Torres et al. | |
| 7,776,108 B2 | 8/2010 | Shah et al. | |
| 8,206,511 B2* | 6/2012 | Collazo-Martinez et al. | 134/6 |
| 8,222,196 B2 | 7/2012 | Smith et al. | |
| 2004/0204332 A1* | 10/2004 | Dastbaz et al. | 510/438 |
| 2005/0096239 A1 | 5/2005 | Barnabas et al. | |
| 2005/0172428 A1 | 8/2005 | Thysell | |
| 2006/0128585 A1 | 6/2006 | Adair et al. | |
| 2006/0160953 A1 | 7/2006 | Wautier et al. | |
| 2006/0211340 A1 | 9/2006 | Thysell | |
| 2007/0099549 A1 | 5/2007 | Palushaj | |
| 2007/0128989 A1 | 6/2007 | Jentgens et al. | |
| 2007/0207922 A1 | 9/2007 | Haindl et al. | |
| 2007/0215184 A1 | 9/2007 | Jonke et al. | |
| 2007/0253926 A1* | 11/2007 | Tadrowski et al. | 424/70.13 |
| 2008/0146734 A1 | 6/2008 | Youngblood et al. | |
| 2008/0248989 A1 | 10/2008 | Holderbaum et al. | |
| 2008/0313819 A1 | 12/2008 | Penninger et al. | |
| 2009/0170744 A1 | 7/2009 | Meine et al. | |
| 2009/0311302 A1 | 12/2009 | Youngblood et al. | |
| 2009/0317621 A1 | 12/2009 | Youngblood et al. | |
| 2010/0004152 A1 | 1/2010 | Karagianni et al. | |
| 2011/0079246 A1* | 4/2011 | Collazo-Martinez et al. | 134/6 |
| 2012/0077045 A1 | 3/2012 | Smith et al. | |
| 2012/0088420 A1 | 4/2012 | Smith et al. | |
| 2012/0145188 A1 | 6/2012 | Smith et al. | |
| 2012/0148830 A1 | 6/2012 | Smith et al. | |

FOREIGN PATENT DOCUMENTS

| | | | |
|---|---|---|---|
| EP | 0627281 A2 | 12/1994 | |
| EP | 0562730 B1 | 10/1996 | |
| EP | 0845326 B1 | 6/1998 | |
| EP | 1186379 B1 | 3/2002 | |
| EP | 1292428 B1 | 3/2003 | |
| EP | 1524077 B1 | 4/2005 | |
| EP | 1702714 B1 | 9/2006 | |
| GB | 0973294 A | 10/1964 | |
| GB | 1082153 A | 9/1967 | |
| GB | 1141943 A | 2/1969 | |
| GB | 1163852 A | 9/1969 | |
| GB | 1528592 A | 10/1978 | |
| JP | 1148416 A | 2/1999 | |
| JP | 2001192983 A | 7/2001 | |
| JP | 2005023149 A | 1/2005 | |
| WO | WO9420264 A1 | 9/1994 | |
| WO | WO0123518 A1 | 4/2001 | |
| WO | WO2005071030 A2 | 8/2005 | |
| WO | WO2006021529 A1 | 3/2006 | |
| WO | WO2006097141 A1 | 9/2006 | |
| WO | WO2007117952 A1 | 10/2007 | |
| WO | WO2009074124 A2 | 6/2009 | |
| WO | WO2009/143513 | 11/2009 | |
| WO | WO 2009/143513 | * 11/2009 | C11D 1/83 |
| WO | WO2010/065481 | 6/2010 | |

OTHER PUBLICATIONS

Howarter, John A. et al., "Hydrophilic-oleophobic stimuli-responsive materials and surfaces" Abstract, 1 page, http://docs.lib.purdue.edu/dissertations/AAI3373153/, [retrieved on Aug. 24, 2011].

Howarter, John A. et al., "Oleophobic membranes of enhanced coalescence and separation in oil-in-water systems" POLY 7, Abstract, 1 page, Aug. 16, 2009, http://oasys2.confex.com/acs/238nm/techprogram/P1299044.htm, retrieved on Aug. 23, 2011].

Howarter, John A. et al., "Self-Cleaning and Anti-Fog Surfaces via Stimuli-Responsive Polymer Brushes**" Adv. Mater. Oct. 31, 2007, 19,3838-3843.

Howarter, John A. et al., "Self-Cleaning and Next Generation Anti-Fog Surfaces and Coatings", Macromol. Rapid Commun. 2008, 29, 455-466.

Howarter, John A. et al., "Surface Modification of Polymers with 3-Aminopropyltriethoxysilane as a General Pretreatment for Controlled Wettability", Macromolecules, Jan. 30, 2007, 40, 1128-1132.

Howarter, John A. et al., "Surfactant modified membranes for the separation of oil-in-water emulsions" POLY 705, Abstract, 1 page, Apr. 10, 2008, http://oasys2.confex.com/acs/235nm/techprogram/P11150723.htm, [retrieved on Aug. 24, 2011].

Howarter, John A. et al., "Synthesis and characterization of bulk self-cleaning polymers" POLY 104 Abstract, 1 page, Apr. 6, 2008, http://oasys2.confex.com/acs/235nm/techprogram/P1139556.htm, [retrieved on Aug. 24, 2011].

International Search Report and Written Opinion issued in PCT/IB2010/054508, dated Jul. 27, 2011, 8 pages.

Ober, Christopher K. et al., "Block copolymers as surface modifiers: Synthesis, characterization, and relevance to fouling release and biostability" PMSE 353 Abstract, 1 page, Mar. 27, 2003, http://oasys2.confex.com/acs/225nm/techprogram/P609111.htm, [retrieved on Aug. 24, 2011].

Ober, Christopher K. et al., "Surface-Active Materials with Antifouling Properties", Proceedings published 2004 by the American Chemical Society, 2 pages.

Slip Control, R20 Floor Cleaner-Polisher-Non-Slip, Copyright © 2004 SlipControl.com, last modified Mar. 15, 2006, 4 pages.

Stop Slip Floor Cleaner and Traction Treatment, manufactured by Johnson Diversey, © 2006 Dadepaper Company, 1 page.

Stratton, Thomas R. et al, "In Vitro Biocompatibility Studies of Antibacterial Quaternary Polymers" Biomacromolecules Aug. 27, 2009, 10, 2550-2555.

Stratton, Thomas R. et al., "Activity and biocompatibility of poly(vinyl pyridine)-based copolymers" PMSE 207 Abstract, Apr. 8, 2008, 1 page, http://oasys2.confex.com/acs/235nm/techprogram/P1158850.htm, [retrieved on Aug. 24, 2011].

Stratton, Thomas R. et al., "Biocompatibility of quaternary poly(vinyl pyridine)-based bactericidal copolymers as determined by invitro assays of human epithelium" POLY 180 Abstract, 1 page, Aug. 17, 2009, http://oasys2.confex.com/acs/238nm/techprogrann/P1297760.htm, [retrieved on Aug. 23, 2011].

Youngblood, Jeffrey P. et al., "Coatings Based on Side-chain Ether-linked Poly(ethylene glycol) and Fluorocarbon Polymers for the Control of Marine Biofouling", Biofouling, Apr. 19, 2003, vol. 19 (Supplement), pp. 91-98.

Youngblood, Jeffrey P. et al., "Plasma polymerization using solid phase polymer reactants (non-classical sputtering of polymers)", Thin Solid Films, vol. 382, Issues 1-2, Feb. 14, 2001, pp. 95-100.

Youngblood, Jeffrey P. et al., "Bioinspired Materials for Self-Cleaning and Self-Healing" MRS Bulletin, vol. 33, Aug. 2008, www.mrs.org/bulletin, pp. 732-741.

Youngblood, Jeffrey P. et al., "Hydrophilic and oleo phobic stimuli-responsive surfaces" POLY 76 Abstract, 1 page, Mar. 25, 2007, http://oasys2.confex.com/acs/233nm/techprogram/P1 049953.htm, [retrieved on Aug. 24, 2011].

Youngblood, Jeffrey P. et al., "New materials for marine biofouling resistance and release: Semifluorinated and PEGylated block copolymer bilayer coatings" PMSE 351 Abstract, 1 page, Mar. 27, 2003, http://oasys2.confex.com/acs/225nm/techprogram/P595545.htm, [retrieved on Aug. 24, 2011].

* cited by examiner

SOIL RESISTANT FLOOR CLEANER

CROSS-REFERENCE TO RELATED APPLICATIONS

This application claims the benefit under 35 U.S.C. §119 (e) to U.S. Provisional Patent Application No. 61/422,373, entitled "Soil Resistant Floor Cleaner," and U.S. Provisional Patent Application Ser. No. 61/422,376, entitled "Soil Resistance Floor Treatment," each of which were filed on Dec. 13, 2010. The entire contents of these patent applications are hereby expressly incorporated herein by reference including, without limitation, the specification, claims, and abstract, as well as any figures, tables, or drawings thereof.

This application is related to U.S. patent application Ser. No. 13/304,924, entitled "Soil Resistant Floor Treatment," and U.S. patent application Ser. No. 13/304,922, entitled "Soil Resistant Floor Treatment," which were each filed on even date herewith. This application is also related to U.S. patent application Ser. No. 13/304.846, entitled "Soil Resistant Cleaner and Surface Treatment," and U.S. patent application Ser. No. 13/304,844, entitled "Soil Resistant Surface Treatment," each of which were filed on even date herewith and each of which is a continuation-in-part application of U.S. application Ser. No. 12/617,121 issued as U.S. Pat. No. 8,222,196 filed on Nov. 12, 2009, entitled "Composition and Method for Removal of Polymerized Non-Trans Fats." The entire contents of these patent applications are hereby expressly incorporated herein by reference including, without limitation, the specification, claims, and abstract, as well as any figures, tables, or drawings thereof.

FIELD OF THE INVENTION

The present invention relates generally to the field of detergent compositions for cleaning a hard surface. In particular, the present invention relates to a detergent composition that increases the anti-slip, soil resistance, and/or gloss properties of a floor surface and that is safe to apply daily. The present invention also relates to methods of employing these detergent compositions.

BACKGROUND

Various substrate materials can be used for flooring including marble, granite, terrazzo, concrete, dry shake, ceramic tiles, wood, laminate, linoleum, vinyl, cork, bamboo and rubber. A clean, shiny and non-slip floor surface, such as a stone surface, is desirable to consumers. Stone surfaces are often polished for a glossy appearance and then maintained through a cleaning process, such as daily cleaning with a daily cleaner or daily cleaner/conditioner. After the surface of the floor is polished, the gloss tends to decrease with time and/or use. To restore the glossy appearance of stone surfaces, the surface is typically first treated with a polish restoration agent using a floor machine under wet conditions. After being treated with the polish restoration agent, the residue of the polish restoration agent is removed through water rinses. Generally, different polish restoration agents are used depending on the type of surface substrate that is being polished. For example, a marble polishing compound is used for marble surface polishing while a granite polishing cream is used for granite surface polishing.

While this method is effective in providing a glossy and smooth texture to the surface, the polishing may lower the coefficient of friction of the surface. The coefficient of friction of a polished surface may also be reduced during use (such as through traffic on the surface or contamination of the surface). The reduction of the coefficient of friction of a surface can result in a slippery surface that may cause accidental slips and falls. To increase the safety of users walking on the surface, an anti-slip or slip-resistant agent can be applied to the surface to increase the coefficient of friction of the surface. Most slip resistant treatments are applied separately from the cleaning and polishing processes. To treat the surface, the surface is first cleaned with a dust mop and then a slip resistant agent is applied. Optionally, after the surface is treated with the slip agent, the surface can be buffed with pads. Alternatively, some slip resistant treatments are designed to etch and/or texture the floor surface to increase the coefficient of friction. However, these treatments tend to reduce the smooth, glossy floor appearance desired by many consumers.

SUMMARY

The present invention relates to detergent compositions for cleaning, enhancing gloss, providing soil resistance and/or increasing anti-slip properties of a surface. The present compositions can be applied to the surface daily. The present invention also relates to methods employing these compositions.

One embodiment is a cleaning composition including at least one fatty acid salt based detergent constituting up to about 50% by weight of the composition; an anti-slip agent constituting up to about 20% by weight of the composition; a soil resistant agent constituting up to about 20% by weight of the composition; and water.

Another embodiment is a cleaning composition including up to about 20% by weight of a soil resistant agent comprising at least one copolymer (including salts and derivatives thereof) of maleic and olefin copolymer having a molecular weight of from about 1,000 to about 20,000 g/mol; up to about 50% by weight fatty acid salt; and water. The cleaning composition may further include at least one amphoteric acrylic polymer.

A further embodiment is a method of cleaning a floor surface, in which a detergent composition including a cleaning agent, an anti-slip agent and a soil resistant agent is applied to the floor surface. The cleaning agent may include a fatty acid salt constituting up to about 50% by weight of the composition. The anti-slip agent may constitute up to about 20% by weight of the composition. The soil resistant agent may constitute up to about 20% by weight of the composition. The composition may have a pH of between about 7 and about 11. The cleaning composition may be diluted prior to application.

A still further embodiment is a kit comprising a detergent composition, a soil resistant agent such as the maleic/olefin copolymer disclosed herein, an applicator, and instructions. The detergent composition and the soil resistant agent can be provided in separate containers. A method of using the kit includes combining the first and second containers, and optionally diluting prior to applying the floor surface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The present invention relates to compositions including cleaning agents, gloss enhancing agents, slip resistant agents (also referred to as anti-slip agents) and/or soil resistant agents that are environmentally safe for daily use. The detergent compositions of the present invention may be employed in any of a wide variety of situations in which it is desired to reduce overall labor when cleaning or/and maintaining a surface, such as a floor. The detergent compositions may impart a soil or stain resistance to the surface upon which the detergent composition is applied, thereby simplifying subsequent cleanings. The detergent compositions may also increase the slip resistance of the surface by increasing or maintaining the coefficient of friction of the floor, which may reduce the number of slips or falls on the surface. The detergent compositions may further increase the overall gloss appearance of the surface when measured at a 20, 60 or 85 degree angle.

While the detergent compositions are discussed as being applied to uncoated floors (e.g. not coated with floor finishes or other coating materials) such as polished and unpolished marble, polished and unpolished concrete, terrazzo and ceramic tile, the detergent compositions may also be applied to coated porous or non-porous floors. For example, the detergent compositions may be applied on finish coated marble, granite, terrazzo, concrete, dry shake, ceramic tiles, wood, linoleum, vinyl, cork, bamboo and rubber substrates. Examples of coatings include but are not limited to factory-applied coatings, jobsite-applied coatings, and floors treated with restorers. Factory-applied coatings are applied to the flooring substrates before the substrate pieces are installed at a jobsite. Jobsite-applied coatings are applied to the flooring substrates after the substrate pieces have been installed. Restorers are applied to the coated floor surfaces as an interim maintenance step before instead of scrubbing or stripping the floor of previous coatings and applying a new coating. The coating may include one component or multi component systems which may be applied as single or multiple layers. Finishes used for coating a floor substrate include acrylic, polyurethanes, epoxy coatings, UV curable compositions, and aziridine crosslinked floor finishes. Examples of acrylic-based coatings include Gemstar Stratus, GemStar Laser, and Taj Mahal from Ecolab. Examples of polyurethane-based coatings include Maxx Durable and the Courtmaster II System from Ecolab. Methods suitable for cleaning a surface using the detergent composition are also provided.

The detergent composition generally includes one or more cleaning agents, soil resistant agents, anti-slip agents and/or gloss enhancing agents. Suitable component concentrations for the concentrated detergent composition range from between about 4% and about 50% by weight cleaning agent, between about 0.1% and about 20% by weight gloss-enhancing agent, between about 0.5% and about 20% by weight anti-slip agent, between about 0.1% and about 20% by weight soil resistant agent, and water. In some embodiments, a separate gloss-enhancing agent and/or anti-slip agent is not included.

Particularly suitable component concentrations for concentrated detergent compositions of the present invention range from between about 5% and about 40% by weight cleaning agent, between about 0.1% and about 15% by weight gloss-enhancing agent, between about 0.5% and about 15% by weight anti-slip agent between about 0.2% and about 15% by weight soil resistant agent, and water. More particularly suitable component concentrations for the detergent composition range from between about 6% and about 35% by weight cleaning agent, between about 0.15% and about 10.0% by weight gloss-enhancing agent, between about 2.0% and about 10% by weight anti-slip agent, between about 0.3% and about 10% by weight soil resistant agent and water. Those skilled in the art will appreciate other suitable component concentration ranges for obtaining comparable properties of the detergent composition.

The cleaning agent can be composed of any components used to form a detergent. For example, the cleaning agent may be formed of amines, fatty acids, alkaline sources, salts, solvents, surfactants or combinations thereof. In one embodiment, the cleaning agent is a fatty acid salt formed by the combination of a fatty acid and an alkalinity source. In particular, the cleaning agent may be formed of fatty acid(s) and alkali metal hydroxide(s), fatty acid(s) and alkali metal carbonate(s) and/or fatty acid(s) and amine(s). Alkali metals and alkali earth metals are referred to collectively as "alkali metals". Alkali metals include alkali metals (Group 1 of periodic table) such as Lithium, Sodium, and Potassium and alkali earth metals (Group 2 of periodic table) such as Magnesium and Calcium. For example, the cleaning agent may be a mixture of oleic acid and monoethanolamine (MEA), or a mixture of fatty acids, such as palm kernel and tall oil, and potassium hydroxide. Although the singular form of fatty acid, fatty acid salt and alkaline source may be used herein, one skilled in the art will recognize that one or more different fatty acids, fatty acid salts and/or alkalinity sources may be present.

The term "fatty acid" includes any of a group of carboxylic acids that can be derived from or contained in an animal or vegetable fat or oil. Fatty acids are composed of a chain of alkyl groups and characterized by a terminal carboxyl group. The alkyl groups can be linear or branched. The fatty acid can be saturated or unsaturated. In some embodiments, the chain of alkyl groups contain from 4 to 24 carbon atoms, particularly from 6 to 24 carbon atoms, and more particularly from 12 to 18 carbon atoms. The detergent composition can include combinations or mixtures of different fatty acids. Examples of suitable fatty acids include oleic acid, palmitic acid, palm kernel fatty acid, coconut fatty acid, tall oil fatty acid, and stearic fatty acid, but a broad variety of other fatty acids or combinations or mixtures thereof are contemplated for use. Examples of suitable fatty acid-containing detergent compositions include StoneMedic Daily Cleaner Conditioner (DCC), NeoMat Forte and NeoMat S, which are aqueous soap based cleaners all available from Ecolab.

When a fatty acid is used as the cleaning agent in the detergent composition, the detergent composition can include an effective amount of one or more alkaline sources to enhance cleaning of a substrate and improve soil removal performance of the detergent composition. As referred to herein "fatty acid salt" refers to a fatty acid and one or more alkaline sources. The alkaline source can be added at such an amount to fully or partially neutralize the fatty acid(s). In some cases, the alkalinity source may be added in excess. In general, it is expected that the composition may include the alkaline source in an amount (active) of at least about 0.1% by weight, at least about 1% by weight, at least about 5% by weight, or at least about 10% by weight.

Examples of suitable alkaline sources for the fatty acid salt included in the detergent composition include, but are not limited to alkali metal carbonates, alkali metal hydroxides, and amines. Alkali metals include alkali metals (Group 1 of periodic table) such as Lithium, Sodium, and Potassium and alkaline earth metals (Group 2 of periodic table) such as Magnesium and Calcium. Alkali metals and alkali earth metals are referred to collectively as "alkali metals". Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45%, a 50% and a 73% by weight solution. It is preferred that the alkali metal hydroxide is added in the form of an aqueous solution, particularly a 45% by weight hydroxide solution, to reduce the amount of heat generated in the composition due to hydration of the solid alkali material.

Amines are organic derivatives of ammonia in which one or more of the ammonia hydrogens are replaced by alkyl or aromatic groups. A variety of organic amines may be employed in the compositions and methods of the present invention. Representative organic amines include alkyl amines, which may be primary, secondary, or tertiary, such as isopropylamine, ethylmethylamine and trimethylamine, or substituted organoamines (e.g., alkanolamines) such as monoethanolamine, diethanolamine and triethanolamine, 1,2-diaminoethane, 1,2-diaminopropane, N-benzylethanolamine, 2-aminomethylpropanol, furfurylamine, tetrahydrofurfurylamine and the like, and mixtures thereof, or isopropanolamines such as monoisopropanolamine, diisopropanolamine, triisopropanolamine and the like, and mixtures thereof, or aliphatic ether amines such as the Tomamine Ether PA Series and DA Series from Air Products and the like, and mixtures thereof, or cyclic amines such as morpholine, or ethoxylate amines such as ethoxylated tallow amine, ethoxylated coconut amine, ethoxylated alkyl propylene amines, the Tomamine Ether E-Series from Air Products and the like, and mixtures thereof, or amino alcohol such as 2-amino-2-methyl-1-propanol and the like and mixtures thereof. In particular, the amine may be an organoamine which may be accompanied by other amines or by salts of the amines.

In addition to the first alkaline source, the detergent composition may comprise a secondary alkaline source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkaline agents are commonly available in either aqueous or powdered form, either of which is useful in formulating the present solid detergent compositions.

The cleaning agent is present in an amount effective to provide detersive properties. More specifically, the molar ratio of the fatty acid and alkaline source are present in an amount effective to provide detersive properties. An effective amount should be considered as an amount that provides a use composition having a wide pH range of between about 3 and about 14, particularly between about 5 and 10, and more particularly between about 7 and about 9.5. Additional pH adjusting agents may be used to provide the use composition with the desired pH. Suitable pH adjusting agents for such alkaline-based compositions include organic and inorganic acids, such as acetic acid, hydrochloric acid, sulfuric acid and citric acid.

The optional gloss-enhancing agent is formed of materials which increase gloss on the flooring surface. Example gloss-enhancing agents can be formed of water-soluble or water-dispersible film-forming polymeric materials. The film-forming material can be a single component or a formulated composition. The film-forming material can be in the form of a solid, paste, gel, solution, emulsion or suspension. Examples of suitable single component film-forming polymeric materials include, but are not limited to: water-soluble or water-dispersible acrylic polymers, such as polyacrylic acid and its copolymers; metal cross-linked acrylic polymers, such as water-soluble or water-dispersible acid-containing polymers crosslinkable using transition metals, alkaline earth metals, alkali metals or mixtures thereof (e.g., zinc crosslinked acrylics) polystyrene and its copolymers, such as maleic acid/styrene copolymers; polyurethanes; epoxy polymers; wax emulsions, such as polyethylene and, polypropylene waxes; alkali soluble acrylic resins; polyvinylpyrrolidone and its copolymers; polyvinyl alcohol and its copolymers; modified cellulose; sulfonated polystyrenes, polyamide and its copolymers; polyethylene vinyl acetate polymers (e.g., polyvinyl acetate-polyethylene copolymers); chloropolymers; fluoropolymers; polycarbonate polymers; cellulose polymers, ethylene copolymer emulsions and their mixtures and a variety of other materials that will be familiar to those skilled in the art.

Examples of suitable commercially available gloss-enhancing single component agents include Duraplus 2 modified acrylic metal crosslinked polymer, Duraplus 3 zinc crosslinked acrylic dispersion, PRIMAL™ E-2409 polymer emulsion, PRIMAL™ NT-6035 APEO- and metal-free polymer emulsion, UHS™ PLUS Metal-crosslinked, modified acrylic polymer, all available from Rohm & Haas Co., Philadelphia, Pa.; Megatran 205 zinc crosslinked acrylic dispersion and Syntran 1580 zinc crosslinked acrylic dispersion, available from Interpolymer Corp. Canton, Mass.; Morglo 2 zinc crosslinked acrylic dispersion, Mor-Glo 2007 styrene-acrylic polymer emulsion and ML-870 zinc containing styrene-acrylic polymer emulsion available from Omnova Solutions, Inc. Fairlawn, Ohio.

As previously mentioned, the gloss enhancer may be a single polymer, a mixture of several polymers, a formulated polymer solution, or a formulated polymer emulsion, such as a high gloss floor finish without departing from the intended scope of the present invention. Examples of suitable formulated film-forming materials include acrylic finishes or a mixture of an acrylic polymer, alkali soluble resin and polyethylene wax emulsion. Examples of a suitable commercially available formulated film-forming material include, for example, MarketStar and Laser, available from Ecolab Inc., St. Paul, Minn.

Suitable concentrations for the gloss-enhancing agent range from between about 0.1% and about 20% by weight. Particularly suitable concentrations for the gloss-enhancing agent range from between about 0.1% and about 15% by weight. More particularly suitable concentrations for the gloss-enhancing agent range from between about 0.15% and about 10% by weight. Additionally suitable concentrations for the gloss-enhancing agent range from between about 0.1% and about 55%, between about 0.2% and about 50%, and between about 0.5% and about 45%.

In one embodiment, a surface treated with the detergent composition has an increase in 60° gloss of at least about 20% after the composition is applied to the surface. Particularly, the surface treated with the detergent composition has an increase in 60° gloss of at least about 30%, at least about 40%, at least about 50%, at least about 60%. In another embodiment, a surface treated with the detergent composition has an increase in 20° gloss of at least about 10% after the composition is applied to the surface. Particularly, the surface treated with the detergent composition has an increase in 20° gloss of at least about 30%, at least about 40%, at least about 50%. In a further embodiment, a surface treated with the detergent composition has an increase in 85° gloss of at least about 20% after the composition is applied to the surface. Particularly, the surface treated with the detergent composition has an increase in 85° gloss of at least about 40%, at least about 50%, at least about 60%. The gloss of the surfaces treated with the compositions are determined by measuring the light reflectance of the surfaces at about 20 degrees, at about 60 degrees and/or at about 85 degrees using a Micro-TRI-Gloss meter available from BYK-Gardner, Columbia, Md.

In another embodiment, similar gloss-enhancing performance can be achieved without including a discrete gloss-enhancing component. For example, certain cleaning agents such that the fatty acid salts discussed herein may provide sufficient gloss to render a separate agent unnecessary.

The optional anti-slip agent can be a single component or a multi-component system. Exemplary single component anti-slip agents include alkyl polyglucosides. In one embodiment, the anti-slip agent may be a polyglucoside. In particular, the polyglucoside may be composed of water and alkyl polyglucoside mixtures. A suitable component concentration for the anti-slip agent for the detergent composition ranges from between about 0.5% and about 20% by weight of the anti-slip agent. A more particular component concentration for the anti-slip agent for the detergent composition ranges from between about 1.0% and about 15% by weight of the anti-slip agent. A more particular component concentrations for the anti-slip agent for the detergent composition ranges from between about 2.0% and about 10% by weight of the anti-slip agent. Those skilled in the art will appreciate other suitable component concentration ranges for obtaining comparable properties of the detergent composition. Examples of suitable commercially available anti-slip agents include, but are not limited to, StoneMedic Anti-Slip Treatment (AST) available from Ecolab Inc., Saint, Paul, Minn. and Glucopon 425N available from Cognis Corporation, Cincinnati, Ohio. Additional anti-slip agents include KP140 (Tri-Butoxyethyl Phosphate), Bindzil CC30 (30% solids colloidal silica solution) and glycerin.

In addition to the anti-slip agents referenced herein, the use of fatty acid detergents as the cleaning agent may also impact the coefficient of friction of a floor surface. For example, the use of palm kernel oil and/or tall oil in various concentrations may further impact the anti-slip properties of the composition.

In one embodiment, the detergent composition comprises, consists essentially of or consists of at least one soil resistant agent. A soil resistant agent refers to a chemical agent that reduces the severity of a stain (e.g., repels staining) on a substrate surface caused by soil contact, and/or promotes easier stain removal (e.g., releases stains) from a substrate surface by decreasing the adhesion of soil and/or soil penetration on the surface through substrate surface modification or other physical or chemical mechanisms.

Particularly suitable soil resistant agents include polycarboxylate co-polymers of maleic/olefin, more particularly, a maleic/hydrophobicly-modified olefin co-polymer. The olefin segment may include a variety of linear, branched and cyclic alkenes. Suitable alkenes may include or be derived from propylene, ethylene, or butylenes. Particularly suitable alkenes may include or be derived from butylene, for example, isobutylene and diisobutylene. Other suitable stain resistant agents include silicone materials such as polydimethysiloxane materials (e.g., Wacker HC303 from Wacker Silicones), fluorochemical materials (e.g., Capstone ST100 and ST300 from Dupont), polycarboxylate copolymers (e.g., Acusol 460 from Dow), and acrylic polymers (Rhoplex EZ Clean 200 from Dow, Polyquart® Pro, Polyquart® Ampho 149, and Polyquart® EcoClean from Cognis). Any combination of the foregoing agents may also be used to provide enhanced stain resistance. According to one embodiment, the soil resistant agent is substantially free of fluorinated or silicone substituents. According to a further embodiment the maleic/hydrophobicly-modified olefin copolymer does not exhibit viscosity-building or any threshold activity. According to one embodiment the composition is substantially free or free of volatile organic compounds. According to a still further embodiment the composition is substantially free or free of alkali soluble resins, plasiticizers, solvents such as volatile organic compound containing (VOC) solvents, and waxes. According to a still further embodiment the composition is substantially free or free of threshold agents and/or rheology modifiers.

The detergent composition may further comprise additional soil resistant agents to provide improved and/or synergistic soil resistance. These additional soil resistant agents can have a beneficial impact on gloss as well. Suitable additional soil resistant agents include acrylic copolymers. Particularly suitable acrylic copolymers are amphoteric acrylic copolymers and have molecular weights of at least 5,000 g/mol, more particularly, at least 10,000 g/mol. The weight ratio of acrylic copolymer to the maleic/olefin copolymer may be, for example, from 0.02:1 to 5:1 (where all the materials are 100% active), particularly, from approximately 0.05:1 to 3:1, more particularly, from approximately 0.05:1 to 2:1, and more particularly, from approximately 0.05:1 to 1:1. Suitable commercially available acrylic copolymers include Polyquart® Pro, Polyquart® Ampho 149, and PolyQuart® EcoClean, which are available from Cognis Corporation. As discussed further below, it has been found that Polyquart® Pro and Polyquart® Ampho 149 can be used in combination with other soil resistant agents disclosed herein to provide soil resistant capability that is better than the stain resistance achieved when either agent is used alone.

In some embodiments, the maleic/olefin copolymer has a low molecular weight, preferably less than approximately 20,000 g/mol, preferably less than 10,000 g/mol, more preferably less than about 7,000 and still more preferably less than about 3,000. According to another embodiment of the invention, the co-polymer has a molecular weight from approximately 1,000 to 20,000 g/mol, from 2,000 to 10,000 g/mol, or from approximately 2,000 to 5,000 g/mol. The term "molecular weight," as used herein with reference to the molecular weight of polymers and copolymers, refers to the calculated average molecular weight value of the polymer or copolymer, which one skilled in the art will appreciate to encompass a reasonable percent error as a result of the statistical method applied for such calculation and the variations in the polymer molecules.

Exemplary maleic/olefin co-polymers such as Sokalan CP9 and ES8804 are produced by BASF. The maleic/olefin co-polymer has a maleic/olefin molar ratio from approximately 1:4 to 4:1, preferably from approximately 1:2 to 2:1, more preferably approximately 1:1. According to a further preferred embodiment, the olefin contains an alkyl group having more than 3 carbons, preferably more than 4 carbons. The glass transition temperature of the maleic/olefin co-polymer is above the use temperature of the co-polymer, preferably above 10° C., and more preferably above 20° C. In some embodiments, a dried film of the maleic/olefin copolymer exhibits an oil/water contact angle ratio of the laminate surface of at least 2.

The resulting composition can be homogeneous or non homogeneous, can be in the form of solid, liquid including emulsion or dispersion, gel, and paste, can be a single part or multi part package. The composition may also include additional functional materials disclosed below.

Additional Functional Materials

The detergent composition can include additional components or agents, such as additional functional materials. As such, in some embodiments, the detergent composition including the cleaning agent, optional gloss-enhancing agent, optional anti-slip agent and soil resistance agent may provide a large amount, or even all of the total weight of the detergent composition. For example, in embodiments having few or no additional functional materials disposed therein. The functional materials provide desired properties and functionalities to the detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and a broad variety of other functional materials may be used. For example, many of the functional materials discussed below relate to materials used in cleaning applications. However, other embodiments may include functional materials for use in other applications.

Solvents

Exemplary organic solvents that can be used include hydrocarbon or halogenated hydrocarbon moieties of the alkyl or cycloalkyl type, and have a boiling point well above room temperature, i.e., above about 30° C.

Considerations for selecting organic solvents include beneficial properties and aesthetic considerations. For example, in some applications where malodors would not be tolerated, the formulator would be more likely to select solvents which have a relatively pleasant odor, or odors which can be reasonably modified by perfuming.

The C6-C9 alkyl aromatic solvents, especially the C6-C9 alkyl benzenes, preferably octyl benzene, exhibit excellent grease removal properties and have a low, pleasant odor. Likewise the olefin solvents having a boiling point of at least about 100° C., especially alpha-olefins, preferably 1-decene or 1-dodecene, are excellent grease removal solvents.

Generically, the glycol ethers can be used. Exemplary glycol ethers include monopropyleneglycolmonopropyl ether, dipropyleneglycolmonobutyl ether, monopropyleneglycolmonobutyl ether, ethyleneglycolmonohexyl ether, ethyleneglycolmonobutyl ether, diethyleneglycolmonohexyl ether, monoethyleneglycolmonopropyl ether-, diethyleneglycolmonobutyl ether, and mixtures thereof.

Solvents such as pine oil, orange terpene, benzyl alcohol, n-hexanol, phthalic acid esters of C1-4 alcohols, butoxy propanol, Butyl Carbitol® and 1(2-n-butoxy-1-methylethoxy)propane-2-ol (also called butoxy propoxy propanol or dipropylene glycol monobutyl ether), hexyl diglycol (Hexyl Carbitol®), butyl triglycol, isopropyl alcohol, diols such as 2,2,4-trimethyl-1,3-pentanediol, and mixtures thereof, can also be used.

The concentrate can include the organic solvent component in an amount to provide the desired cleaning, product stability and evaporative properties. In general, the amount of solvent should be limited so that the use solution is in compliance with volatile organic compound (VOC) regulations for a particular class of cleaner. In addition, it should be understood that the organic solvent is an optional component and need not be incorporated into the concentrate or the use solution according to the invention. When the organic solvent is included in the concentrate, it can be provided in an amount of between about 0.1 wt. % and about 75 wt. %, between about 1 wt. % and about 50 wt. %, and between about 3 wt. % and about 30 wt. %.

Surfactants

The detergent composition can include a surfactant or surfactant mixture. A variety of surfactants can be used in a detergent composition, including, but not limited to: anionic, nonionic, cationic, and amphoteric (including zwitterionic) surfactants. Surfactants are an optional component of the detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912. When the detergent composition includes a surfactant or a mixture of surfactants, the surfactant is provided in an amount effective to provide a desired level of functionality, such as wetting, stability, foam profile and cleaning. The detergent composition, when provided as a concentrate, can include the surfactant in a range of about 0.05% to about 50% by weight, about 0.5% to about 40% by weight, about 1% to about 30% by weight, about 1.5% to about 20% by weight, and about 2% to about 15% by weight. Additional exemplary ranges of surfactant in a concentrate include about 0.5% to about 10% by weight, and about 1% to about 8% by weight.

Examples of anionic surfactants useful in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, alpha-olefinsulfonate, sulfonated fatty acid esters; sulfates such as sulfated alcohols including fatty alcohol sulfates, sulfated alcohol ethoxylates, sulfated alkylphenols, alkylsulfates, sulfosuccinates, and alkylether sulfates.

Examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va.

Examples of cationic surfactants that can be used in the detergent composition include, but are not limited to: the acid salts of amines, as for example, primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkyldimethylbenzyl ammonium chloride, tetradecyldimethylbenzylammonium chloride, didecyldimethylammonium chloride and a naphthylene-substituted quaternary ammonium chloride such as trimethyl-1-naphthylammonium chloride. The cationic surfactant can be used to provide sanitizing properties.

Examples of amphoteric surfactants that can be used in the detergent composition include, but are not limited to: betaines such as dodecyl dimethyl sulfobetaine, imidazolines, and propionates.

Some surfactants can also function as secondary solidifying agents if a solid detergent composition is desired. For example, anionic surfactants which have high melting points provide a solid at the temperature of application. Anionic surfactants which have been found most useful include, but are not limited to: linear alkyl benzene sulfonate surfactants, alcohol sulfates, alcohol ether sulfates, and alpha olefin sulfonates. Generally, linear alkyl benzene sulfonates are preferred for reasons of cost and efficiency. Amphoteric or zwitterionic surfactants are also useful in providing detergency, emulsification, wetting and conditioning properties. Representative amphoteric surfactants include, but are not limited to: N-coco-3-aminopropionic acid and acid salts, N-tallow-3-iminodiproprionate salts, N-lauryl-3-iminodiproprionate disodium salt, N-carboxymethyl-N-cocoalkyl-N-dimethylammonium hydroxide, N-carboxymethyl-N-dimethyl-N-(9-octadecenyl)ammonium hydroxide, (1-carboxyheptadecyl)trimethylammonium hydroxide, (1-carboxyundecyl) trimethylammonium hydroxide, N-cocoamidoethyl-N-hydroxyethylglycine sodium salt, N-hydroxyethyl-N-stearamidoglycine sodium salt, N-hydroxyethyl-N-lauramido-.beta.-alanine sodium salt, N-cocoamido-N-hydroxyethyl-.beta.-alanine sodium salt, mixed alcyclic amines and their ethoxylated and sulfated sodium salts, 2-alkyl-1-carboxymethyl-1-hydroxyethyl-2-imidazolinium hydroxide sodium salt or free acid wherein the alkyl group may be nonyl, undecyl, and heptadecyl. Other useful amphoteric surfactants include, but are not limited to: 1,1-bis(carboxymethyl)-2-undecyl-2-imidazolinium hydroxide disodium salt and oleic acid-ethylenediamine condensate, propoxylated and sulfated sodium salt, and amine oxide amphoteric surfactants.

Polymers

Optionally polymer additives can be used in the detergent composition to provide desirable benefits. Examples of the benefits include that some polymers can function as solidifying agents if a solid detergent composition is desired. Some polymers can function as a solution rheology modifier, some polymers can function as a chelating agent, some polymers can function as a stabilizer and some polymers can provide multi-benefits to the detergent composition.

Exemplary polymer rheology modifiers include Acusol 810A and Acusol 842, both are alkali soluble acrylic polymer emulsions available from Dow Chemical. These materials also function as stabilizers. Other examples of polymeric stabilizers include ACUSOL 820, a hydrophobically modified alkali soluble acrylic polymer emulsion (HASE) and polyols such as ACUSOL™ 880, a hydrophobically modified, nonionic polyol. Both are available from Dow Chemical. Exemplary polymeric chelating agent include acrylic polymers and their copolymers, such as ACUSOL™ 497N, a copolymer of acrylic acid and maleic anhydride available from Dow Chemical.

Fragrances

Various odorants including perfumes and other aesthetic enhancing agents can also be included in the composition. Fragrances or perfumes that may be included in the compositions include, but are not limited to: terpenoids such as citronellol, aldehydes such as amyl cinnamaldehyde, a jasmine such as C1S-jasmine or jasmal, and vanillin.

Other Functional Materials

In addition to the functional materials mentioned above, other optional additional functional materials that can be included in the detergent composition of the present invention include chelating agents such as ethylene diamine tetraacetic acid (EDTA) and its sodium salts; pH adjusters such as amines, acids and pH buffers; foam modifiers such as silicone defoamers; coloring agents, such as dyes; pearlising agents; wetting agents; stabilizers; and viscosity modifiers/rheology modifiers.

Methods of Use

In an embodiment, the present invention includes methods employing the detergent composition including the optional gloss-enhancing agent, the optional anti-slip agent and the soil resistant agent. The method can result in increased gloss and anti-slip properties of a surface, as well as stain resistance. In general, a detergent composition having improved gloss-enhancing, anti-slip and stain resistant properties can be created by combining a cleaning agent, an optional gloss-enhancing agent, an anti-slip agent, a soil resistant agent and any additional functional components, and mixing the components to form a homogeneous mixture. For example, in a first embodiment, the detergent composition may include a cleaning agent, a gloss-enhancing agent, an anti-slip agent, a soil resistant agent, an alkalinity source, amines, solvents, a pearlising agent, surfactants, polymers, fatty acids, plasticizers and a fragrance. In an exemplary embodiment, the detergent composition includes a cleaning agent constituting between about 4% and about 50% by weight of the composition, an anti-slip agent constituting between about 0.5% and about 20% by weight of the composition, a soil resistant agent constituting between about 0.1% and about 20% by weight of the composition and water. In particular, the detergent composition includes a cleaning agent including between about 5% and about 40% by weight of the composition, an anti-slip agent constituting between about 1.0% and about 15% by weight of the composition, a soil resistant agent constituting between about 0.2% and about 15% by weight of the composition and water. More particularly, the detergent composition includes a cleaning agent including between about 6% and about 35% by weight of the composition, an anti-slip agent constituting between about 2.0% and about 10% by weight of the composition, a soil resistant agent constituting between about 0.3% and about 10% by weight of the composition and water.

Prior to applying the detergent composition, a concentrated form of the composition can be diluted with water to form a use solution. For example, the dilution ratio of concentrate to water can be about 1:256 to about 1:128 to about 1:64 to about 1:11. The use solution can be applied on various coated or non-coated, porous or non-porous substrates including stone surface such as marble, concrete (including polished concrete), granite, terrazzo, and ceramic tiles and other surfaces, such as wood, laminates, linoleum and vinyl composition tile. The detergent composition is applied to a surface on a daily or a weekly basis. In one embodiment, the composition is applied onto a surface at least about 3 days a week. In an alternative embodiment, the composition is applied onto a surface once a day. The present methods include applying the detergent composition by any means known in the art. For example, the composition may be applied using a scrubber, a mop, a roller or a spray. Examples of suitable scrubbers include manual and auto floor scrubbers. Examples of suitable mops include string and flat mops.

A surface treated with the composition generally dries within about 1 hour of when the composition is applied to the surface. However, the amount of time it takes a surface coated with the composition to dry depends on the method used to apply the composition and the environmental conditions. A surface treated with the composition may dry within about 30 minutes, about 15 minutes, about 5 minutes and about 1 minute of when the composition is applied to the surface. For example, if the composition is applied with a mop and bucket, the surface will dry within about 5 to 15 minutes. If the composition is applied with an autoscrubber, the surface will dry almost immediately.

Kits/Cleaning Systems

According to a further embodiment of the invention, the detergent compositions of the invention can be packaged and provided as kits or cleaning. According to an embodiment of the invention, a system may comprise, consist of and/or consist essentially of an applicator, instructions for use of the system, a removal agent for removing a plurality of soils from a treated surface, at least detergent, at least one soil resistant agent, and optionally an anti-slip agent and/or gloss enhancement agent. Example applicators include but are not limited to: a scrubber, a mop, a roller or a spray. Examples of suitable scrubbers include manual and auto floor scrubbers. Examples of suitable mops include string and flat mops.

The detergent and soil resistant agent may be provided in separate containers, and the anti-slip agent and/or gloss enhancement agent may be provided in the container with the detergent, the soil resistant agent or in a separate third container. The contents of the containers may be combined and diluted with water to form a use solution. Alternatively, the detergent, the soil resistant agent and the anti-slip agent and/or gloss enhancement agent (if present) may be diluted prior to combining the contents to form a use solution.

Exemplary Formulations

Particular embodiments of the invention have the following formulations and component concentrations in weight percentages of raw material added:

TABLE B

| Component | Range 1 (wt %) | Range 2 (wt %) | Range 3 (wt %) | Range 4 (wt %) |
|---|---|---|---|---|
| DI Water | 10-85 | 25-75 | 35-65 | 50-85 |
| Defoamer | 0.25-10.0 | 0.5-5.0 | 0.5-2.0 | 0.5-2.0 |
| Surfactant | 0.0-10.0 | 0.5-5.0 | 1.0-5.0 | 1.0-5.0 |
| Soil resistant agent (amphoteric acrylic copolymer) | 0.0-10.0 | 0.5-5.0 | 0.5-2.0 | 0.5-2.0 |
| Soil resistant agent (maleic/olefin copolymer) | 0.1-20.0 | 0.5-10.0 | 1.0-5.0 | 1.0-5.0 |
| Gloss-enhancing agent | 0-55% | 0-50% | 0-45% | 0-45% |
| Slip resistant agent | 0.1-10.0 | 0.5-10.0 | 1.0-5.0 | 1.0-5.0 |
| Chelating agent | 0.25-10.0 | 0.5-5.0 | 0.5-2.0 | 0.5-2.0 |
| Cleaning agent | 4-50 | 5-40 | 6-35 | 6-24 |

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used

StoneMedic DCC: a cleaner/conditioner available from Ecolab, Inc., St. Paul, Minn.

MarketStar: a floor finish available from Ecolab, Inc., St. Paul, Minn.

StoneMedic Anti-Slip Treatment (AST): an anti-slip agent available from Ecolab, Inc., St. Paul, Minn.

StoneMedic Absorbent Stone Impregnator (ASI): water based impregnator designed to protect against both water and oil borne stains on absorbent natural stone, terrazzo, concrete and grout, available from Ecolab, Inc., St. Paul, Minn.

NeoMat Forte: soap based cleaner available from Ecolab, Inc., St. Paul, Minn.

TABLE A

| Component | Tradename | Description | Source |
|---|---|---|---|
| DI Water | — | Deionized Water | — |
| Defoamer | SWS-211 | Silicone Antifoam Emulsion | Wacker Silicones |
| Surfactant | Various | Sodium Xylene Sulphonate (SXS) | Various |
| Soil Resistant Agent | Polyquart Ampho 149 | Amphoteric Acrylic Copolymer | Cognis |
| Soil Resistant Agent | ES8804 | Maleic/Olefin Copolymer | BASF |
| Soil Resistant Agent | Sokalan CP9 | Maleic/Olefin Copolymer | BASF |
| Slip Resistant Agent | Glucopon 425 N | Alkyl Polyglucoside | Cognis |
| Chelating Agent | Various | Ethylenediaminetetraacetic Acid (EDTA) | Various |
| Cleaning Agent | Prifac 7908 | Palm Kernel Based Fatty Acid | CRODA |
| | Potassium Hydroxide, 45% Liquid | — | Various |
| Cleaning Agent | Tall Oil Fatty Acid | — | Various |
| | Potassium Hydroxide, 45% Liquid | — | Various |

NeoMat S: soap based cleaner available from Ecolab, Inc., St. Paul, Minn.

Bindzil CC30: colloidal silica solution available from Akzo Nobel.

Belclene 283: a maleic acid copolymer as scale/deposit control agent available from FMC Corporation, Philadelphia, Pa.

Hostapur SAS, 30%: a secondary alkane sulfonate sodium salt available from Clariant Corporation, The Woodlands, Tex.

Morglo 8: a styrene acrylic zinc cross-linked polymer emulsion (38% solids) available from Omnova Solutions, Inc. Fairlawn, Ohio.

Glucopon 425 N: an alkyl polyglucoside available from Cognis, Cincinnati, Ohio.

Capstone ST100: 19-20% active solids, aqueous fluorochemical dispersion available from DuPont.

Capstone ST300: 15% active solids, aqueous fluorochemical dispersion available from DuPont.

HC 303: 17% solids, finely dispersed water based silicone emulsion available from Wacker Chemical Corp.

ES8804: 25% solids, maleic/hydrophobically modified olefin copolymer.

Motor Oil: 10/30 W wt., All Season, Holiday Gas Station or equivalent.

Oil Dag: Acheson Colloids Company, Pot Huron, Mich.; Purchased through Harrigan Industrial Technologies, Inc. (N117W19345 Fulton Drive, Germantown, Wis. 53022).

Bandy Black Clay: Bandy Black Clay, Ball Clay, Hydrous Aluminum Silicate—CAS#1332-58-7 supplied by HC Spinks Clay Co. Inc, (PO Box 830, Paris, Term. 38042).

PolyQuart Pro: an acrylic copolymer available from Cognis.

EZ Clean 200: a polymer based stain resistant agent available from Dow.

Bright Neutral: A surfactant-based cleaner from Ecolab.

Prifac 7908: Palm kernel based fatty acid available from Croda.

Tall Oil Fatty Acid: available from multiple sources.

PolyQuart Ampho 149: an acrylic copolymer available from Cognis.

Emery 629 Stripped Coconut Fatty Acid: coconut fatty acid available from Emery Oleochemicals.

Oleic Acid: available from multiple sources

Tung Oil: available from multiple sources

Potassium hydroxide: 45% liquid form.

Sokalan CP9: sodium salt of a maleic anhydride/hydrophobically modified olefin copolymer available from BASF.

Acusol 929: acrylic acid homopolymer (43-47% active) available from Dow Chemical.

SXS: sodium xylene sulfonate available from ChemSolv, Inc.

Surface Preparation and Treatment

A plurality of uncoated Terrazzo tiles were used to measure the gloss and the coefficients of friction of surfaces treated with detergent compositions of the present invention. The tiles that were used to measure gloss were prepared by sanding the tiles using a hand sander with 50 grit paper until the gloss of the tiles were less than about 6 when measured at 20 degrees and less than about 8 when measured at about 60 degrees.

The tiles that were used to measure coefficient of friction were cleaned three times with the use solution by pouring about 20 ml of solution onto about 4 square inches of the tile and spreading the use solution with a microfiber pad and squeegeeing the remainder. The tiles were allowed to dry for about 10 minutes. After the tiles were dry, the gloss and the coefficients of frictions were measured and noted.

The compositions described in the examples below were diluted at a ratio of about 1:128 composition to water to form a use solution Examples 1 and 2 and Comparative Example A Examples 1 and 2 are compositions of the present invention for enhancing gloss of a surface. In particular, the compositions of Examples 1 and 2 include a mixture of StoneMedic DCC, a cleaner, and MarketStar, a floor finish. The components were added together and mixed to form a homogeneous mixture.

Comparative Example A was used as the control and included only the StoneMedic DCC.

Table 1 provides the component concentrations and the pHs for the compositions of Examples 1 and 2.

TABLE 1

| Component | Example 1 (wt %) | Example 2 (wt %) |
|---|---|---|
| StoneMedic DCC | 98 | 97 |
| MarketStar | 2 | 3 |
| pH | 9.77 | 9.77 |

The gloss of the compositions of Examples 1 and 2 were measured at about 20 degrees and about 60 degrees. The light reflectance of the surfaces totaling about one square foot were measured 5 times and averaged. To measure the gloss of the surfaces treated with the compositions, the light reflectance of the surfaces were measured at about 20 degrees and about 60 degrees after each of sequential four steps: (1) treating with a TWISTER® White pad, (2) treating with a TWISTER® Yellow pad, (3) treating with a TWISTER® Green pad and (4) dry treating with a TWISTER® Green pad. There was no cleaner on the tile during the dry treating step, which was a dry step. Each treatment included 15 passes over the surface at a pressure of about 6 pounds and a speed of about 625 revolutions per minute, with the total cycle lasting about 72 seconds. For treatment steps 1-3 in which a cleaner was present, about 3-6 mls of cleaner was applied per 6 inches of tile. The equipment used to clean/polish the surface with the pads was the Precision Force Applicator, available from Precision Analytical Instruments Inc. The pads are available from TWISTER®, manufactured by HTC, Inc., Knoxville, Tenn. The light reflectance of the surfaces was measured using the Micro-TRI-Gloss meter, available from BYK-Gardner, Columbia, Md.

Table 2 provides the gloss build measured at 20 degrees and at 60 degrees for the compositions of Examples 1 and 2. Generally, the higher the 20 degree and 60 degree gloss build up on a surface, the glossier the appearance of the surface.

TABLE 2

| | Initial | First Treatment | Second Treatment | Third Treatment | Fourth Treatment |
|---|---|---|---|---|---|
| | | | 20 degrees | | |
| Example 1 | 0.9 | 2.1 | 3.7 | 11.4 | 22.6 |
| Example 2 | 5.4 | 3.9 | 8.4 | 12.5 | 24.4 |
| | | | 60 degrees | | |
| Example 1 | 3 | 14.1 | 19.4 | 43.9 | 67.6 |
| Example 2 | 19.4 | 21.9 | 32.1 | 38.2 | 55.4 |

As illustrated in Table 2, the 20 degree and 60 degree gloss of the surfaces treated with the compositions of Examples 1 and 2 increased as the surfaces were successively cleaned. In particular, the final surface treated with the composition of Example 1 had an increase of about 2411% in 20 degree gloss and an increase of about 2153% in 60 degree gloss. The final surface treated with the composition of Example 2 had an increase of about 352% in 20 degree gloss and an increase of about 186% in 60 degree gloss.

The coefficient of friction of the surfaces treated with the compositions of Examples 1 and 2 and Comparative Example A were then measured using the Universal Walkway Tester BOT 3000 to determine whether the gloss enhancing agent had an effect on the coefficient of friction of a surface coated with the composition. Three coefficients of friction (CoF) were measured: dry static coefficient of friction (Dry SCoF), static wet coefficient of friction (Wet SCoF) and wet dynamic coefficient of friction (Wet DCoF). Static CoF (SCoF) is the force required to initiate sliding of a static object on a surface divided by the force which maintains contact between the object and the surface. Dynamic COF (DCoF) is the force required to arrest the motion of a moving object on a surface divided by the force which maintains contact between the object and the surface. A low CoF indicates high slipperiness. For most material combinations, the value of the static coefficient of friction exceeds that of the value of the dynamic coefficient of friction.

To measure the dry SCoF, a leather sensor was used with the BOT 3000, Binary Output Tribometer provided by Universal Walkway Testings. The sensor was sanded with a 320 grit pad and dusted. The sensor was then placed in the BOT 3000 and the dry static coefficient of friction was taken on the cleaner treated surface. A total of three individual measurements were taken and averaged for a final value.

To measure the wet SCoF, a neolite sensor was used with the BOT 3000. The sensor was sanded with a 100 grit pad and dusted. The sensor was then equilibrated in about 0.5 inches of deionized water for about five minutes before being placed in the sensor port. A two by twenty inch trail of deionized water was applied on the surface of the cleaner treated sample. The BOT 3000 was then placed on the surface in the manner so that the sensor aligned with the trail of deionized water and the wet static coefficient of friction was taken. A total of three individual measurements were taken and averaged for a final value.

To measure the wet DCoF, a neolite sensor was used with the BOT 3000. The sensor was sanded with a metal file about 0.5 inches thick and dusted. The sensor was then equilibrated in about 0.5 inches of deionized water for about five minutes before being placed in the sensor port. A two by twenty inch trail of deionized water was applied on the surface. The BOT 3000 was then placed on the surface in the manner so that the sensor aligned with the trail of the deionized water and the wet dynamic coefficient of friction was taken. A total of three individual measurements were taken and averaged for a final value.

Table 3 provides the coefficients of friction (CoF) of the compositions of Examples 1 and 2 and Comparative Example A.

TABLE 3

|  | Avg. Dry SCoF | Avg. Wet SCoF | Avg. Wet DCoF |
|---|---|---|---|
| Example 1 | 0.38 | 0.87 | 0.28 |
| Example 2 | 0.35 | 0.91 | 0.32 |
| Comp. Example A | 0.34 | 0.73 | 0.48 |

As can be seen in Table 3, and taking into the standard deviation, the surfaces treated with the compositions of Examples 1 and 2 exhibited substantially similar or slightly higher dry and wet static coefficients of friction than the surface treated with the composition of Comparative Example A. Thus, the gloss-enhancement agent likely had little or no affect on the coefficient of friction of the surfaces coated with the compositions of Examples 1 and 2.

Examples 3 and 4

Examples 3 and 4 are compositions of the present invention for increasing the slip resistance of a surface. The compositions of Examples 3 and 4 are similar to the compositions of Examples 1 and 2, except that the compositions of Examples 3 and 4 included an anti-slip agent, rather than the gloss enhancement agent. In particular, the compositions of Examples 3 and 4 included StoneMedic DCC, a cleaner, and StoneMedic Anti-Slip Treatment, an anti-slip agent. The components were mixed together to form a homogeneous mixture.

The composition of StoneMedic DCC was used as Comparative Example A.

Table 4 provides the component concentrations for the compositions of Examples 3 and 4 and Comparative Example A.

TABLE 4

| Component | Example 3 (wt %) | Example 4 (wt %) | Comp. Ex. A (wt %) |
|---|---|---|---|
| StoneMedic DCC | 98 | 97 | 100 |
| StoneMedic Anti-Slip Treatment | 2 | 3 | 0 |

The compositions of Examples 3 and 4 and Comparative Example A were then tested for the dry static coefficient of friction and wet static coefficient of friction using the methods described above for the compositions of Examples 1 and 2 and Comparative Example A. The surfaces were treated with the compositions of Examples 3 and 4 and Comparative Example A a first time, a second time and a third time. After each treatment, the coefficients of friction were measured and recorded. Table 5 provides the coefficients of friction of the compositions of Examples 3 and 4, Comparative Example A, and untreated surface after each treatment.

TABLE 5

|  | First Treatment | Second Treatment | Third Treatment |
|---|---|---|---|
|  | Dry Static Coefficient of Friction | | |
| Example 3 | 0.48 | 0.44 | 0.50 |
| Example 4 | 0.50 | 0.56 | 0.58 |
| Comp. Example A | 0.50 | 0.42 | 0.44 |
|  | Wet Static Coefficient of Friction | | |
| Example 3 | 0.89 | 0.87 | 0.86 |
| Example 4 | 0.87 | 0.88 | 0.87 |
| Comp. Example A | 0.87 | 0.90 | 0.85 |

As can be seen in Table 5, the surfaces treated with the compositions of Examples 3 and 4 exhibited higher dry static coefficients of friction than the surface treated with the composition of Comparable Example A. While the dry static CoF of the surfaces treated with the compositions of Examples 3 and 4 and the composition of Comparative Example A were substantially the same after the first treatment, the dry static CoF of the surface treated with the composition of Example 4 was about 33% higher than the dry static CoF of the surface treated with the composition of Comparative Example A after the second treatment. After the third treatment, the dry static CoF's of the surfaces treated with the compositions of Examples 3 and 4 were about 13.6% and about 31.8% higher, respectively, than the surface treated with the composition of Comparative Example A.

Examples 5, 6, 7, 8 and 9

Examples 5, 6, 7, 8 and 9 are compositions for evaluating gloss enhancement. The compositions of Examples 5-9 included component concentrations (in weight percent) of water, oleic acid, monoethanolamine (MEA), Hostapur SAS, Belclene 283 and Morglo 8 as provided in Table 6. The components were added together and mixed to form a homogeneous mixture.

As the composition of Example 1 was shown to perform effectively as a gloss enhancer, the composition of Example 1 was used as the control. The composition of Example 1 included 98% by weight StoneMedic DCC and 2% by weight MarketStar and had a pH of 9.77.

Table 6 provides the component concentrations of the compositions of Examples 1, 5, 6, 7, 8 and 9 as well as the pH of each of the compositions.

TABLE 6

| Component | Example 5 (wt %) | Example 6 (wt %) | Example 7 (wt %) | Example 8 (wt %) | Example 9 (wt %) |
|---|---|---|---|---|---|
| Water | 67.87 | 67.28 | 66.92 | 67.83 | 67.05 |
| Oleic Acid | 9 | 9 | 9 | 9 | 9 |
| MEA | 3 | 3 | 3 | 3 | 3 |
| Hostapur SAS, 30% | 20 | 20 | 20 | 20 | 20 |
| Belclene 283 | 0.13 | 0.72 | 0.13 | 0 | 0 |
| Morglo 8 | 0 | 0 | 0.95 | 0.17 | 0.95 |
| pH | 10.1 | 9.97 | 10.14 | 10.17 | 10.18 |

The gloss of the compositions of Examples 5-9 and Example 1 were measured at about 20 degrees and 60 degrees initially and after each of three cleaning treatments with a Gardner Abrasion Tester and an HTC Twister Polishing floor pad available from TWISTER®, manufactured by HTC, Inc., Knoxville, Tenn. The light reflectance of the surfaces were measured using the Micro-TRI-Gloss meter, available from BYK-Gardner, Columbia, Md. The three cleaning treatments included: (1) treating with a TWISTER® White pad, (2) treating with a TWISTER® Yellow pad and (3) treating with a TWISTER® Green pad.

The floor cleaning simulation used the Gardner Abrasion Tester. About 1 pound of weights was added to the Gardner original carrier to mimic the pressure added by the user or machine when the floor is being cleaned. Each of the pads was cut to about 0.38" by 0.3" to fit inside the Gardner straight-line tester's carrier. The pads were rinsed in tap water 3 times and shaken dry. To simulate an autoscrubber application, the pads were saturated with about 25 ml of solution and 20 cycles were run. The tiles were removed from the template, gently rinsed with water and set to dry. Table 7 provides the gloss build measured at 20 degrees and 60 degrees for the compositions of Examples 5-9 and Example 1.

TABLE 7

| | Initial | First Treatment | Second Treatment | Third Treatment |
|---|---|---|---|---|
| | | 20 Degrees | | |
| Example 5 | 0.4 | 0.4 | 0.8 | 0.9 |
| Example 6 | 0.4 | 0.9 | 0.8 | 1.5 |
| Example 7 | 0.5 | 1.5 | 2.6 | 1.9 |
| Example 8 | 0.4 | 0.8 | 3 | 3.7 |
| Example 9 | 0.3 | 0.9 | 5.5 | 6.7 |
| Example 1 | 0.6 | 0.9 | 1 | 1.2 |
| | | 60 Degrees | | |
| Example 5 | 4.2 | 4.4 | 6.8 | 9 |
| Example 6 | 3.3 | 8.2 | 8.8 | 13.8 |
| Example 7 | 5 | 12.7 | 16.2 | 12.8 |
| Example 8 | 4.6 | 7.1 | 18.3 | 20 |
| Example 9 | 4.4 | 9 | 17.6 | 25.1 |
| Example 1 | 4.8 | 8.3 | 10.6 | 12.5 |

As illustrated in Table 7, the 20 degree gloss and 60 degree gloss of the surfaces treated with the compositions of Examples 5-9 increased with almost each treatment. The surface treated with the composition of Example 5 had a 20 degree gloss substantially similar to the surface treated with the composition of the control (Example 1) after about 2 treatments while the surfaces treated with the compositions of Examples 6-9 had a 20 degree gloss either substantially similar to, or greater than, the surface treated with the composition of Example 1. When measuring 60 degree gloss, the surfaces treated with the compositions of Example 6-9 had comparable results to the surface treated with the control after about one treatment.

After all of the treatments were completed, the surface treated with the composition of Example 5 had a 125% increase in 20 degree gloss and a 114% increase in 60 degree gloss, the surface treated with the composition of Example 6 had a 275% increase in 20 degree gloss and a 318% increase in 60 degree gloss, the surface treated with the composition of Example 7 had a 280% increase in 20 degree gloss and a 156% increase in 60 degree gloss, the surface treated with the composition of Example 8 had an 825% increase in 20 degree gloss and a 335% increase in 60 degree gloss and the surface treated with the composition of Example 9 had a 2133% increase in 20 degree gloss and a 470% increase in 60 degree gloss.

By contrast, the surface treated with the control composition of Example 1 showed a 100% increase in 20 degree gloss and a 160% increase in 60 degree gloss.

Examples 10, 11, 12, 13, 14 and 15

Coefficient of Friction Test

Examples 10, 11, 12, 13, 14 and 15 are compositions of the present invention for increasing the gloss enhancement and the slip resistance of a detergent composition. Once the gloss enhancement of the compositions of Examples 5-9 were measured, varying amounts of an anti-slip agent was added to the compositions of Examples 8 and 9, which exhibited the highest gloss enhancement properties, to form the compositions of Examples 10-15. The compositions of Examples 10-15 included component concentrations (in weight percent) of water, oleic acid, monoethanolamine (MEA), Hostapur SAS, Belclene 283, Morglo 8 and anti-slip agent, as provided in Table 8. The anti-slip agent used was Glucopon 425-N. The components were added together and mixed to form a homogeneous mixture.

The composition of Comparative Example 1 was used as the control and included only the StoneMedic DCC. The composition of Comparative Example 1 did not contain an anti-slip agent.

Table 8 provides the component concentrations for the compositions of Examples and 10-15, the pH of each of the compositions.

TABLE 8

| Component | Example 10 (wt %) | Example 11 (wt %) | Example 12 (wt %) | Example 13 (wt %) | Example 14 (wt %) | Example 15 (wt %) |
|---|---|---|---|---|---|---|
| Water | 64.92 | 65.83 | 65.05 | 63.92 | 64.83 | 64.05 |
| Oleic Acid | 9 | 9 | 9 | 9 | 9 | 9 |
| MEA | 3 | 3 | 3 | 3 | 3 | 3 |
| Hostapur SAS, 30% | 20 | 20 | 20 | 20 | 20 | 20 |
| Belclene 283 | 0.13 | 0 | 0 | 0.13 | 0 | 0 |
| Morglo 8 | 0.95 | 0.17 | 0.95 | 0.95 | 0.17 | 0.95 |
| Glucopon 425-N | 2 | 2 | 2 | 3 | 3 | 3 |
| pH | 10.12 | 10.14 | 10.16 | 10.07 | 10.17 | 10.18 |

The static coefficient of friction of each of the surfaces treated with the compositions of Examples 10-15 and Comparative Example 1 were measured and noted below in Table 9. The static coefficient of friction of each of the tiles was measured using ASTM F 489-96 *Standard Test Method for using a James Machine*.

TABLE 9

| | Coefficient of Friction |
|---|---|
| Example 10 | 0.69 |
| Example 11 | 0.75 |
| Example 12 | 0.72 |
| Example 13 | 0.68 |
| Example 14 | 0.71 |
| Example 15 | 0.69 |
| Comparative Example 1 | 0.53 |

As illustrated in Table 9, the surfaces treated with the compositions of Examples 10-15 had higher coefficients of friction than the surface treated with the composition of Comparative Example 1. In particular, while the surface treated with the control composition of Comparative Example 1 had a CoF of about 0.53, the surfaces treated with the compositions of Examples 10-15 had CoFs of between about 0.68 and about 0.75, a difference of between about 28% and 41%, respectively.

Examples 11, 12, 14 and 15

Toner (Soil Attraction) Test

The compositions of Examples 11, 12, 14 and 15 were then tested to determine the tackiness level of a surface coated with each of the compositions and the ability of surfaces coated with each of the compositions to attract soil. The compositions of Examples 11, 12, 14 and 15 were diluted with water at a ratio of about 1:128.

The composition of StoneMedic DCC, a cleaner available from Ecolab Inc., St. Paul, Minn., was used as Comparative Example A. The composition of StoneMedic Anti-slip Treatment (AST), an anti-slip agent available from Ecolab Inc., St. Paul, Minn., was used as Comparative Example B.

To test the tackiness of surfaces coated with the compositions, 2 black foam rings were adhered to sample tiles. The StoneMedic DCC and StoneMedic AST were diluted to their recommended dilution rates. In particular, the StoneMedic DCC was diluted at a ratio of about 1:128 StoneMedic DCC to water and the StoneMedic AST was diluted at a ratio of about 1:48 to water. A 0.5 gram sample of the solutions were added onto the foam ring and allowed to contact the tiles overnight. The tackiness of the treated surface was then evaluated with a toner method by applying a uniform black toner layer with a sponge paint brush to the tested area. Excess toner was wiped away with a yellow microfiber cloth. A surface having a higher tackiness level will cause a greater amount of black toner to adhere to the surface. The more black toner that adhered on the surface, the more black the surface.

A BYK-Gardner SpectroGuide was used to measure the color change by measuring the L-value of the tested area. The L-value is the lightness of the color value from black to white. A lower L-value represents a more black appearance. An average of 5 measurements was recorded.

Table 10 illustrates the L-value, which reflects the tackiness levels of Examples 11, 12, 14 and 15 and Comparative Examples A and B. Generally, a lower L-value indicates that more soil attached to the surface due to the higher tackiness of the surface.

TABLE 10

| Composition | L-Value |
|---|---|
| Example 11 | 70.22 |
| Example 12 | 71.79 |
| Example 14 | 68.16 |
| Example 15 | 73.53 |
| Comparative Example A | 67.54 |
| Comparative Example B | 53.84 |

As can be seen in Table 10, the surfaces coated with the compositions of Examples 11, 12, 14 and 15 had a higher L-value than both of the surfaces coated with the compositions of Comparative Example A and Comparative Example B, indicating that the compositions of Examples 11, 12, 14 and 15 have lower tackiness levels than the compositions of Comparative Example A and Comparative Example B. Thus, surfaces coated with the compositions of Examples 11, 12, 14 and 15 attract soils to a lesser extent than surfaces coated with the compositions of Comparative Example A, a known cleaner, and the composition of Comparative Example B, a known anti-slip agent.

Examples 10, 11, 12, 13, 14 and 15

Cotton (Tack-Free) Test

The compositions of Examples 10, 11, 12, 13, 14 and 15 were then tested to determine the tack-free time for a surface coated with each of the compositions. The compositions were diluted to about a 1:128 ratio of composition to water.

The composition of StoneMedic DCC, a cleaner available from Ecolab Inc., St. Paul, Minn., was used as Comparative Example A. The StoneMedic DCC composition was diluted to about a 1:128 ratio of composition to water. The composition of StoneMedic Anti-slip Treatment, an anti-slip agent available from Ecolab Inc., St. Paul, Minn., was used as Comparative Example B. The StoneMedic Anti-slip Treatment was diluted to about a 1:48 ratio of composition to water.

To test the tack-free time of surfaces coated with the compositions, each of the compositions were applied to a Laneta chart using a #10 drawdown bar. A timer was started immediately after the composition was applied to the surface. The coated surface was closely monitored until it appears relatively dry to the touch. A half inch by half inch square of cotton was then cut and placed on the coated surface. A 2 kg weight was placed on top of the cotton and allowed to remain there for between about 15 to 30 seconds. The weight was then removed and the cotton was lightly brushed with a finger. If the cotton remained adhered to the coated surface, it was considered not to be tack-free and the test was repeated until the cotton no longer adhered to the coated surface. When the cotton no longer adhered to the coated surface, the time was recorded as the tack-free time of the composition. Table 11 illustrates the tack-free times of Examples 10, 11, 12, 13, 14 and 15 and Comparative Examples A and B.

TABLE 11

| Composition | Tack-free Time |
|---|---|
| Example 10 | 13:13 |
| Example 11 | 13:00 |
| Example 12 | 11:00 |
| Example 13 | 10:00 |
| Example 14 | 11:00 |
| Example 15 | 11:20 |
| Comparative Example A | 10:00 |
| Comparative Example B | 12:00 |

As can be seen in Table 11, surfaces coated with the compositions of Examples 12, 13, 14 and 15 had comparable tack-free times as surfaces coated with the compositions of Comparative Example A and Comparative Example B. The surface coated with the composition of Example 13 had a drying time equal to the drying time as the surface coated with the composition of Comparative Example A. While the surfaces coated with the compositions of Example 12, 14 and 15 took a little bit longer to dry than the surface coated with the composition of Comparative Example A, they dried in a shorter amount of time than the surface coated with the composition of Comparative Example B.

However, the surfaces coated with the compositions of Example 10 and 11 required more time to dry than the surfaces coated with the compositions of Comparative Examples A and B.

This data suggests that while surfaces coated with the compositions of Examples 12, 13, 14 and 15 have comparable dry times to surfaces coated with the compositions of Comparative Examples A and B, while surfaces coated with the compositions of Examples 10 and 11 have a longer dry time. Thus, surfaces coated with the compositions of Examples 12, 13, 14 and 15 can be exposed to traffic after substantially the same time as surfaces coated with the compositions of Comparative Examples A and B.

Example 16

Example 16 demonstrates that a concrete surface treated with fatty acid soap-based cleaners exhibit a higher gloss enhancement than if treated with tap water alone. Smooth concrete blocks (6" by 4" by 1") were obtained from Patio Concrete Products, Inc. The blocks were divided into two sections 3 inches by 4 inches and were wiped to remove dust and particles. The gloss of the non-treated surface was measured. The fatty acid soap-based cleaner tested was 10% StoneMedic DCC, diluted with tap water.

The surface was treated by applying about 0.5 ml of the solution evenly to each section using a microfiber pad (about 1" by 1") that was pre-saturated with the same solution. Excess solution was immediately removed with a squeegee, and the block was allowed to dry for 10 minutes before applying a second application. A total of ten applications were applied, and the gloss of the dried surface was measured before each subsequent application.

A BYK Gardner Micro-TRI-Gloss meter was used to measure the surface gloss at 60 degrees and at 85 degrees, taking an average of 5 readings. The gloss increase value reported below was calculated by the treated surface gloss minus the non-treated surface gloss.

TABLE 12

| | 85 degree gloss increase | | 60 degree gloss increase | |
|---|---|---|---|---|
| Number of Applications | DCC | Water | DCC | Water |
| 1 | 2.2 | 0.5 | 1 | 0.2 |
| 2 | 2.7 | 0.6 | 1.3 | 0.2 |
| 3 | 3.2 | 1.6 | 1.3 | 0 |
| 4 | 3.5 | 1.9 | 1.5 | 0.1 |
| 5 | 3.5 | 2.2 | 1.6 | .3 |
| 6 | 3.9 | 2 | 1.8 | .2 |
| 7 | 2.8 | 2 | 1.7 | .2 |
| 8 | 3.8 | 2.9 | 1.8 | .6 |
| 9 | 4.1 | 2.6 | 1.9 | .6 |
| 10 | 4 | 2.2 | 2 | .6 |

As can be seen, the concrete surfaces treated with the fatty acid based-soap exhibited improved gloss with respect to the concrete surfaces treated only with tap water. The gloss increased with additional applications. For example, after 10 applications, DCC showed an 85 degree gloss which is about 180% of the gloss of the surface treated with water.

Example 17

Example 17 demonstrates that concrete surfaces treated with fatty acid soap-based cleaners exhibit a higher gloss enhancement than if treated with a surfactant-based cleaner. In particular, Example 17 shows that a concrete surface treated with StoneMedic DCC and NeoMat S (both fatty acid soap based cleaners) has a higher gloss enhancement than a concrete surface treated with Bright Neutral (a surfactant based neutral cleaner). The procedure was the same as that of Example 16, except that a total of 20 surface treatments were applied and the gloss measurements were made after every other application. All cleaner solutions were 10 weight %, diluted with tap water. Results are shown in the Tables below.

TABLE 13

| Number of Applications | 85 degree gloss increase Bright Neutral | DCC | 60 degree gloss increase Bright Neutral | DCC |
|---|---|---|---|---|
| 2 | 4.1 | 6 | 0.6 | 1.9 |
| 4 | 5.1 | 6.8 | 0.7 | 2.8 |
| 6 | 5.3 | 6.3 | 0.7 | 2.9 |
| 8 | 5.4 | 6.1 | 0.7 | 2.7 |
| 10 | 5.2 | 5.9 | 0.7 | 2.6 |
| 12 | 5 | 5.8 | 0.7 | 2.6 |
| 14 | 5 | 6.4 | 0.7 | 3 |
| 16 | 5.1 | 6.5 | 0.7 | 3.2 |
| 18 | 5.2 | 6.7 | 0.7 | 2.9 |
| 20 | 5 | 6.3 | 0.7 | 2.8 |

As can be seen, the concrete surfaces treated with StoneMedic DCC (the fatty acid soap-based cleaner) exhibited improved gloss with respect to the concrete surfaces treated with Bright Neutral. For example after 20 applications, the 60 degree gloss increase of DCC is about 400% of that treated with Bright Neutral.

TABLE 14

| Number of Applications | 85 degree gloss increase Bright Neutral | NeoMat S | 60 degree gloss increase Bright Neutral | NeoMat S |
|---|---|---|---|---|
| 2 | 3.1 | 3.3 | 0.5 | 1.1 |
| 4 | 3.6 | 4.5 | 0.9 | 2 |
| 6 | 3.2 | 5.5 | 0.7 | 2.9 |
| 8 | 4 | 7.3 | 0.9 | 3.7 |
| 10 | 4 | 6.7 | 0.9 | 3.5 |
| 12 | 3.8 | 7 | 1 | 3.8 |
| 14 | 3.8 | 7.4 | 1 | 4.1 |
| 16 | 3.7 | 8.1 | 1 | 4.4 |
| 18 | 4.6 | 7.9 | 1.3 | 4.4 |
| 20 | 4 | 7 | 1.1 | 4.3 |

Similarly, the concrete surfaces treated with NeoMat S (the fatty acid soap-based cleaner) exhibited improved gloss with respect to the concrete surfaces treated with Bright Neutral. After 20 applications, the 60 degree gloss increase of NeoMat S is about 390% of Bright Neutral and the 85 degree gloss increase of NeoMat S is about 175% of Bright Neutral, respectively.

Example 18

Example 18 demonstrates that fatty acid soap-based cleaners can increase the gloss of a concrete surface. NeoMat S, NeoMat Forte and StoneMedic DCC, all 10 weight percent diluted with tap water, were tested. The procedure was the same as Example 17.

TABLE 15

| Number of Applications (Concrete Block 1) | 85 degree gloss increase NeoMat S | DCC | 60 degree gloss increase NeoMat S | DCC |
|---|---|---|---|---|
| 2 | 3.8 | 2.2 | 0.3 | 0.1 |
| 4 | 3.9 | 2.9 | 0.3 | 0.5 |
| 6 | 4 | 3.3 | 0.5 | 0.7 |
| 8 | 4.9 | 3.5 | 0.9 | 0.8 |
| 10 | 5.2 | 3.8 | 1 | 0.9 |
| 12 | 5.9 | 3.7 | 1.1 | 0.9 |
| 14 | 6.6 | 3.8 | 1.4 | 1 |
| 16 | 6.4 | 4.2 | 1.5 | 1.1 |
| 18 | 6.7 | 4.5 | 1.7 | 1.4 |
| 20 | 7.4 | 4.1 | 2.1 | 1.2 |

TABLE 16

| Number of Applications (Concrete Block 2) | 85 degree gloss increase NeoMat Forte | NeoMat S | 60 degree gloss increase NeoMat Forte | NeoMat S |
|---|---|---|---|---|
| 2 | 2.4 | 4.1 | 7 | 9 |
| 4 | 4.7 | 6 | 9.3 | 10.9 |
| 6 | 4.8 | 6.2 | 9.4 | 11.1 |
| 8 | 4.6 | 6.4 | 9.2 | 11.3 |
| 10 | 4.1 | 7 | 8.7 | 11.9 |
| 12 | 5.1 | 7.2 | 9.7 | 12.1 |
| 14 | 5.5 | 7.3 | 10.1 | 12.2 |
| 16 | 5.5 | 7.5 | 10.1 | 12.4 |
| 18 | 6.3 | 7.6 | 10.9 | 12.5 |
| 20 | 6 | 7.4 | 10.6 | 12.3 |

As can be seen, the concrete surfaces treated with the fatty acid based-soaps exhibited improved gloss with repeated applications.

Example 19

Example 19 demonstrates that the gloss-enhancing performance of NeoMat S is retained when a slip-resistance agent, Glucopon 425N is added. The tested compositions are a 10 weight percent dilution of NeoMat S plus 1.5% Glucopon 425N and a 10 weight percent dilution of NeoMat S plus 3.0% Glucopon 425N. The compositions were diluted with tap water and were mixed on a shaker to obtain uniform solutions. The procedures were the same as Example 17.

TABLE 17

| Number of Applications (Concrete Block 1) | 85 degree gloss increase NeoMat S + 1.5% Glucopon | NeoMat S | 60 degree gloss increase NeoMat S + 1.5% Glucopon | NeoMat S |
|---|---|---|---|---|
| 2 | 7.8 | 7.5 | 1 | 1.4 |
| 4 | 9.5 | 8.9 | 1.7 | 2.3 |
| 6 | 9.6 | 10.5 | 2.2 | 3.4 |
| 8 | 11.2 | 11.3 | 3 | 3.7 |
| 10 | 11.4 | 11.5 | 3.6 | 3.9 |
| 12 | 11.5 | 11.1 | 3.5 | 4.1 |
| 14 | 10.5 | 11.6 | 4 | 4.1 |
| 16 | 9.6 | 12.3 | 4.1 | 4.8 |
| 18 | 13.1 | 12 | 4.9 | 4.8 |
| 20 | 13.6 | 12.6 | 4.6 | 5.2 |

TABLE 18

| Number of Applications (Concrete Block 2) | 85 degree gloss increase NeoMat S + 3.0% Glucopon | NeoMat S | 60 degree gloss increase NeoMat S + 3.0% Glucopon | NeoMat S |
|---|---|---|---|---|
| 2 | 5.6 | 6.2 | 0.9 | 0.9 |
| 4 | 6.7 | 7 | 1.4 | 1.7 |

TABLE 18-continued

| Number of Applications | 85 degree gloss increase | | 60 degree gloss increase | |
|---|---|---|---|---|
| (Concrete Block 2) | NeoMat S + 3.0% Glucopon | NeoMat S | NeoMat S + 3.0% Glucopon | NeoMat S |
| 6 | 8.1 | 7.4 | 2.1 | 2 |
| 8 | 8.8 | 8.1 | 2 | 2.4 |
| 10 | 9 | 8 | 2.3 | 2.3 |
| 12 | 8.2 | 7.9 | 2.4 | 2.3 |
| 14 | 8.4 | 7.3 | 2.5 | 2.2 |
| 16 | 10.2 | 9.5 | 3.3 | 3 |
| 18 | 9.8 | 9.7 | 3.2 | 3.3 |
| 20 | 10 | 9.7 | 3.1 | 3 |

As can be seen, the addition of 1.5 wt % and 3.0 wt % Glucopon 425N had minimal impact on gloss performance of the NeoMat S. For example, after 20 applications, about 10-15% in gloss difference was observed from both 85 degree and 60 degree gloss for the cleaner in contrast to its Glucopon 425N containing versions.

Examples 20-33

Examples 20-33 demonstrate that each of ES8804, Capstone ST-100 and PolyQuart Pro provide good soil removal properties by itself to remove soils, such as oily soils. White grout test coupons and black oily soil mixture were used in this evaluation.

White grout test coupons were prepared by mixing 19.32 wt % deionized water with 80.68 wt % PolyBlend Sanded Grout Mix, Bright White #381, which was manufactured by Custom Building products. Several 2" by 2" test coupons were formed by filling a mold with the mixture and allowing 5 to 7 days of ambient curing.

Black oily soil was prepared by adding the following materials to a beaker and mixing with a stir bar for at least 10 minutes to form a uniform black oily soil.

TABLE 19

| Material | Weight (g) |
|---|---|
| Mineral Spirits | 50.00 |
| Mineral Oil | 5.00 |
| 10/30 W Motor Oil | 5.00 |
| Oil Dag (Graphite Lube) | 2.50 |
| Bandy Black Clay | 37.50 |

The cleaning solutions were formed as indicated in the table below.

TABLE 20

| Example # | ES8804 (uL) | Polyquart Pro (uL) | Capstone ST-100 (uL) | DI Water (mL) | Total PPM of additive |
|---|---|---|---|---|---|
| 20 | 200 | 0 | 0 | 999.8 | 50 |
| 21 | 400 | 0 | 0 | 999.6 | 100 |
| 22 | 4000 | 0 | 0 | 996 | 1000 |
| 23 | 8000 | 0 | 0 | 992 | 2000 |
| 24 | 0 | 217 | 0 | 999.783 | 50 |
| 25 | 0 | 435 | 0 | 999.565 | 100 |
| 26 | 0 | 4348 | 0 | 995.652 | 1000 |
| 27 | 0 | 8696 | 0 | 991.304 | 2000 |
| 28 | 0 | 0 | 333 | 999.667 | 50 |
| 29 | 0 | 0 | 667 | 999.333 | 100 |
| 30 | 0 | 0 | 6667 | 993.333 | 1000 |
| 31 | 0 | 0 | 13333 | 986.667 | 2000 |
| 32 | | Water control | | | |
| 33 | | Water control | | | |

The grout test coupons were soiled with two perpendicular passes of a foam brush saturated with the black oily soil mixture and allowed to dry for 24 hours. The soiled grout coupons were placed into snug fitting punch-outs in a customized template, which was placed into the Gardner Abraser tray. The test coupon was submerged in 220 g of cleaning solution in the Gardner Abraser Tray for one minute. The Gardner Abraser was allowed to pass over the test coupon for 10 cycles with a 1"×2¾"×3¾" yellow 33PP1 DC sponge supplied by Reilly Foam Corporation, which was loaded into the Gardner Abrader carriage with no extra loaded weigh. The test coupons were removed from the Gardner Abraser tray, shaken to remove excess water from the coupon and allowed to air dry for 24 hours.

The test coupons were analyzed with Fiji image analysis software and median color values among the test samples were compared. A higher color value indicates a better cleaning of the soiled surface.

TABLE 21

| Example # | Median Color Value |
|---|---|
| 20 | 157 |
| 21 | 155 |
| 22 | 177 |
| 23 | 147 |
| 24 | 189 |
| 25 | 174 |
| 26 | 173 |
| 27 | 195 |
| 28 | 170 |
| 29 | 149 |
| 30 | 131 |
| 31 | 135 |
| 32 | 152 |
| 33 | 154 |

Examples 24-27, which utilized Polyquart Pro, exhibited the best median color results. ES8804 at 1000 ppm (Example 22) and ST-100 at 50 ppm (Example 28) also exhibited better results than water cleaning (Example 32 &33).

Examples 34-37

Examples 34-37 demonstrate that the addition of a soil resistant agent to a soap based cleaner containing a COF enhancing agent significantly reduced surface soiling. A red wine stain was used for soiling evaluation. All the tests were conducted on white concrete grout coupons which were prepared as discussed above. The red wine was cellared and bottled by Charles Shaw Winery, Napa and Sonoma, Calif., Contains sulfites, ALC: 12.5% by vol.

Glucopon 425N was added to concentrate DCC to form a clear solution containing 3.3% of Glucopon 425N in the cleaner. The cleaner was diluted with tap water to 1.2% wt cleaner and an equal active amount of stain resistant agent was added to the 1.2% diluted cleaner in the weight amounts set forth in the table below.

TABLE 22

| Example # | 1.2% DCC + 425N (g) | ES8804 (25% active) (g) | HC303 (17% active) (g) | ST300 (15% active) (g) |
|---|---|---|---|---|
| 34 | 25.00 | | | |
| 35 | 24.66 | 0.34 | | |
| 36 | 24.50 | | 0.50 | |
| 37 | 24.43 | | | 0.57 |

The white concrete group coupon was divided into two equal sections. Each section was treated with 1.3 g of the diluted cleaner and allowed to dry overnight. A foam ring having an open center diameter of about 0.5 inch with a thickness of about 0.125 inch was adhered on the treated surface. The open area of the ring center was filled with the red wine and the wine was maintained in full position to ensure that the wine was well contacted with the grout surface for 10 minutes. After 10 minutes, the wine inside the ring was removed with a dry paper towel, followed by a wet wiping of the grout surface after removing the ring. The tested area was then wiped with a dry paper towel.

The degree of stain of the grout was evaluated by visual appearance as well as Wb and L value measurement with the BYK Gardner SpectroGuide (45/0 gloss, Cat. No. 6801). A higher Wb or L value indicates less of a soil stain. A lower delta Wb or Delta L represents better stain resistance because the delta value was calculated by (non soiled value−soiled) value.

The results are summarized numerically in the table below:

TABLE 23

| | | non-soiled area | | soiled area | | delta (non-soiled − soiled) | |
|---|---|---|---|---|---|---|---|
| Example # | Coupon # | L | Wb | L | Wb | L | Wb |
| 34 | 1 | 93.15 | 65.47 | 71.55 | 14.79 | 21.6 | 50.68 |
| 35 | 1 | 92.58 | 64.58 | 83.17 | 27.38 | 9.41 | 37.2 |
| 36 | 2 | 92.14 | 58.04 | 77.04 | 22.41 | 15.1 | 35.63 |
| 37 | 2 | 92.37 | 61.17 | 78.86 | 30.66 | 13.51 | 30.51 |

The results indicate that Examples 35-37, which contain a soil resistant agent, had lower delta L and delta Wb values than the control Example 34.

Examples 38-41

Examples 38-41 demonstrate that adding a soil resistant agent, such as ES8804, Wacker HC303 and Capstone ST300, to a gloss enhancing agent containing soap based cleaner, StoneMedic DCC, significantly reduced surface soiling. The red wine stain was used in this example for soiling evaluation. The red wine, its soiling procedure and the white concrete grout coupons are the same as described above except that the cleaner solutions were prepared by adding MorGlo 8, a gloss enhancing agent, to DCC concentrate to form a clear solution containing 5.0 wt % of MorGlo 8 in the cleaner. The cleaner was diluted with tap water to 1.2 wt % and an equal active amount of stain resistant agent was added to the 1.2 wt % cleaner in the following gram amounts.

TABLE 24

| Example # | 1.2% (DCC + Morglo 8) (g) | ES8804 (25% active) (g) | HC303 (17% active) (g) | ST300 (15% active) (g) |
|---|---|---|---|---|
| 38 | 25.00 | | | |
| 39 | 24.66 | 0.34 | | |
| 40 | 24.50 | | 0.50 | |
| 41 | 24.43 | | | 0.57 |

The results are summarized numerically in table 25:

TABLE 25

| | | non-soiled area | | soiled area | | delta (non-soiled − soiled) | |
|---|---|---|---|---|---|---|---|
| Example # | Coupon # | L | Wb | L | Wb | L | Wb |
| 38 | 1 | 92.75 | 63.02 | 67.9 | 7.1 | 24.85 | 55.92 |
| 39 | 1 | 92.71 | 62.11 | 86.99 | 39.52 | 5.72 | 22.59 |
| 40 | 2 | 92.22 | 61.17 | 83.34 | 32.86 | 8.88 | 28.31 |
| 41 | 2 | 92.95 | 64.1 | 82.01 | 33.48 | 10.94 | 30.62 |

The results indicate that Examples 39-41, which contain a soil resistant agent, had lower delta L and delta Wb values, and thus better stain resistance, than the control Example 38. Example 39 containing ES8804 had the best results in terms of delta values.

Examples 42-59

Examples 42-59 demonstrate that adding ES8804 to a COF enhancing agent containing soap based cleaner, NeoMat S, significantly reduced the surface stain. The red wine, its soiling procedure and the white concrete grout coupons were the same as described above except that the cleaner solutions were prepared by adding Glucopon 425N to concentrated NeoMat S to form two solutions containing 1.48 wt % and 2.9 wt % of Glucopon 425N, respectively. These cleaners were diluted with tap water to 1.2 wt % and 2.0 wt %, respectively. Use cleaner solutions were made as follows.

TABLE 26

| Example # | NeoMat S | NeoMat S + 1.48% Glucopon 425N | NeoMat S + 2.9% Glucopon 425N | ES8804 (25% solids) |
|---|---|---|---|---|
| 42 | 1.2%, 25.00 g | | | |
| 43 | 1.2%, 24.66 g | | | 0.34 g |
| 44 | 1.2%, 24.83 g | | | 0.17 g |
| 45 | 2.0%, 25.00 g | | | |
| 46 | 2.0%, 24.66 g | | | 0.34 g |
| 47 | 2.0%, 24.83 g | | | 0.17 g |
| 48 | | 1.2%, 25.00 g | | |
| 49 | | 1.2%, 24.66 g | | 0.34 g |
| 50 | | 1.2%, 24.83 g | | 0.17 g |
| 51 | | 2.0%, 25.00 g | | |
| 52 | | 2.0%, 24.66 g | | 0.34 g |
| 53 | | 2.0%, 24.83 g | | 0.17 g |
| 54 | | | 1.2%, 25.00 g | |
| 55 | | | 1.2%, 24.66 g | 0.34 g |
| 56 | | | 1.2%, 24.83 g | 0.17 g |
| 57 | | | 2.0%, 25.00 g | |
| 58 | | | 2.0%, 24.66 g | 0.34 g |
| 59 | | | 2.0%, 24.83 g | 0.17 g |

The color measurement results are presented below for soil resistance evaluation. A lower delta Wb and delta L indicates an improved resistance to the red wine stain.

TABLE 27

| Example # | non-soiled areas L | non-soiled areas Wb | soiled areas L | soiled areas Wb | delta L | delta Wb |
|---|---|---|---|---|---|---|
| 42 | 93.85 | 72.40 | 69.83 | 14.85 | 24.02 | 57.55 |
| 43 | 93.08 | 66.74 | 87.80 | 39.60 | 5.28 | 27.14 |
| 44 | 92.98 | 65.86 | 86.90 | 39.48 | 6.08 | 26.38 |
| 45 | 94.46 | 75.72 | 80.10 | 25.78 | 14.36 | 49.94 |
| 46 | 93.02 | 65.66 | 89.13 | 40.45 | 3.89 | 25.21 |
| 47 | 92.90 | 65.61 | 87.94 | 39.32 | 4.96 | 26.29 |
| 48 | 93.56 | 71.24 | 74.60 | 21.88 | 18.96 | 49.36 |
| 49 | 92.98 | 65.99 | 86.47 | 30.92 | 6.51 | 35.07 |
| 50 | 93.33 | 67.97 | 88.92 | 44.20 | 4.41 | 23.77 |
| 51 | 93.54 | 70.61 | 83.81 | 30.17 | 9.73 | 40.44 |
| 52 | 93.02 | 65.82 | 88.53 | 40.51 | 4.49 | 25.31 |
| 53 | 93.12 | 66.28 | 89.54 | 43.72 | 3.58 | 22.56 |
| 54 | 93.69 | 71.40 | 68.67 | 6.80 | 25.02 | 64.60 |
| 55 | 93.26 | 66.68 | 86.31 | 32.42 | 6.95 | 34.26 |
| 56 | 93.10 | 65.87 | 86.34 | 33.08 | 6.76 | 32.79 |
| 57 | 93.70 | 71.15 | 84.83 | 28.92 | 8.87 | 42.23 |
| 58 | 92.91 | 65.06 | 86.44 | 31.03 | 6.47 | 34.03 |
| 59 | 93.07 | 66.50 | 88.33 | 38.30 | 4.74 | 28.20 |

As can be seen, both delta Wb and delta L indicate that adding ES8804 to NeoMat S, both with and without adding the Glucopon 425N contributed to improved soil resistance.

Examples 60-74

Examples 60-74 demonstrate the soiling resistance of a soap based cleaner, its COF enhancing agent containing version and a version including both a COF enhancing agent and a soiling resistant agent, each applied to coated VCT flooring tiles.

The tiles were prepared using a 1"×2" piece of microfiber pad (usually cut from a larger pad), a floor finish and a VCT substrate. The substrates were prepared for coating by removing factory-applied coatings by scrubbing with a green "Scotchbrite" pad and non-chlorine abrasive clean and rinsing.

Once the factory coating was stripped, the microfiber coating pad was rinsed with water and partially dried so that the pad was slightly damp. The application rate was determined from the table below.

TABLE 28

| Coating Rate (ft2/gallon) | grams/ft²* | Wet Coating Thickness (mils) |
|---|---|---|
| 2000 | 1.9 | 0.8 |
| 1750 | 2.2 | 0.9 |
| 1500 | 2.5 | 1.1 |
| 1250 | 3.0 | 1.3 |
| 1000 | 3.8 | 1.6 |

*assumes the specific gravity of floor finish is about 1 g/cm³

Next, the tile was even coated and allowed to dry for a sufficient period of time before applying additional coating layers. A total of 15 coats of MarketStar finish were applied onto a 12"×12"×⅛" White Excelon Vinyl Composition Tile (pattern 56830) supplied by Armstrong at 2000 sqft/gal (2.0 g/sqft/coat) over three days with five coats applied per day. The coating on the tile was aged at ambient for about seven months before treating with the cleaners.

A total of five cleaner compositions were formed and tested using varying cleaning processes. A concentrated sample of 3% Glucopon 425N in DCC was made. The concentrate was diluted to 1.2%. Cleaner solutions were prepared as outlined in the table below.

TABLE 29

| Cleaner # | ES8804 (g) | Capstone ST300 (g) | 1.2% DCC + Glucopon 425N (g) | 1.2% DCC (g) | tap water (g) |
|---|---|---|---|---|---|
| 1 | 3.4 | 0 | 246.6 | 0 | 0 |
| 2 | 0 | 5.7 | 244.3 | 0 | 0 |
| 3 | 0 | 0 | 250.0 | 0 | 0 |
| 4 | 0 | 0 | 0 | 250.0 | 0 |
| 5 | 0 | 0 | 0 | 0 | 250.0 |

Several 2" by 10.5" sample coupons were cut from the coated VCT tiles. From 0.20-0.25 g of the various cleaner formulations as described in the above table were applied to the sample coupons with 2-3 parallel passes of a saturated cotton cheesecloth. A total of six applications were applied with at least a 20-30 minute dry time between each application. The sample coupons were allowed to dry at ambient temperatures for 2 days.

Sieved AATCC carpet soil (0.20 g) was mixed with 100.00 g of D-13 101 Zytel Polymer Pellets in a glass jar by hand shaking until the soil was uniformly distributed among the nylon pellets. The sieved AATCC carpet soil was prepared as: Sieve TA2M/9 Carpet Soil (supplied by Textile Innovators, Rock Hill, S.C. 29732) with a 75 micron sieve. The D-13 101 Zytel Polymer Pellets was supplied by Textile Innovators, Rock Hill, S.C.

The surface cleaner treated VCT coupons were secured onto the wall of a soil drum having a diameter of 12" with the treated surface facing the inside of the drum. The soiled nylon pellet mixture was added into the drum followed by sealing the drum with a drum cover. The drum was rotated at the speed of 60 rpm in order to soil the sample coupons for a total of 60 minutes. The Wb value of the samples was collected at 0, 15, 30, 60, and 193 minutes during the soiling.

For the dry cleaning method, paper towel was wrapped on a pink 3M eraser pad and loaded into a Gardner carriage. Sample coupons were then loaded into Gardner abraser tray. Without any additional weight fixed upon the Gardner carriage, the Gardner was passed over each sample for a total of 5 passes with color data collection after 1 pass, 3 passes and 5 passes.

Two different methods were used for the wet cleaning process. One method used tap water as the cleaning media and the second used cleaner solutions to clean the soiled test coupons. A 1"×2¾"×3¾" yellow 33PP1 DC sponge supplied by Reilly Foam Corporation was loaded into the Gardner abraser carriage. Sample coupons were loaded into a Gardner abraser tray. The sample coupon was submerged in 200 g of the cleaning material (water or the cleaner solution) for 1 minute. Without any additional weight fixed upon the Gardner carriage, it was passed over each sample for a total of 6 passes. The sample coupon was removed from the tray and allowed to dry. Data was collected after clean L, a, b, and Wb color data.

The degree of soiling, represented as Wb, was measured by a BYK Gardner SpectroGuide (45/0 gloss, Cat. No. 6801) with an average of 5 readings. A higher Wb value indicated less soiling. As calculated, a higher delta Wb indicated a better soil resistance or soil removal because the delta Wb was calculated by: Wb after cleaning−Wb before cleaning (same as after soiling).

As summarized below, the results show that the additive (ES8804 and Capstone ST300) containing surface treatment conditions showed better soil repellency or soil removal than the no additive containing surface treatment conditions.

TABLE 30

| Example # | Cleaner Composition | Cleaning Process | after clean average Wb | standard deviation | delta Wb (after clean − before clean) |
|---|---|---|---|---|---|
| 60 | Cleaner #1 | dry cleaning | 52.10 | 0.16 | 6.90 |
| 61 | Cleaner #2 | dry cleaning | 52.44 | 1.37 | 3.85 |
| 62 | Cleaner #3 | dry cleaning | 52.82 | 0.43 | 2.53 |
| 63 | Cleaner #4 | dry cleaning | 51.89 | 0.65 | 1.90 |
| 64 | Cleaner #5 | dry cleaning | 52.27 | n/a | 2.25 |
| 65 | Cleaner #1 | with water | 60.41 | 0.36 | 15.21 |
| 66 | Cleaner #2 | with water | 53.40 | 0.54 | 4.81 |
| 67 | Cleaner #3 | with water | 56.18 | 0.44 | 5.88 |
| 68 | Cleaner #4 | with water | 57.20 | 0.30 | 7.21 |
| 69 | Cleaner #5 | with water | 55.47 | 0.22 | 5.45 |
| 70 | Cleaner #1 | with cleaner | 62.01 | 0.08 | 17.40 |
| 71 | Cleaner #2 | with cleaner | 58.60 | 0.32 | 10.59 |
| 72 | Cleaner #3 | with cleaner | 59.26 | 0.90 | 7.72 |
| 73 | Cleaner #4 | with cleaner | 59.14 | 0.25 | 9.17 |
| 74 | Cleaner #5 | with cleaner | 56.55 | 0.80 | 6.69 |

The results indicate that the samples treated with the stain resistant agent, ES8804 and Capstone ST300 (Examples 60, 61, 65, 70 and 71), provided increased soil removability in comparison to the non-soil resistant agent containing cleaners (Examples 62-64, 67-69 and 72-74).

Examples 75-90

The concentrate formulations set forth in table 31 below were used to prepare Examples 75-90 as also set forth in the table 32 below. Formulations 1-4 each included Polyquart Pro, a commercially available amphoteric acrylic copolymer from Cognis Corporation. Formulation 5 did not use Polyquart Pro, and experiments using Formulation 5 are labeled as comparative examples. EZ Clean 200 is an acrylic emulsion available from Dow Chemical. The various components for each formulation were combined and shaken for 15 seconds.

TABLE 31

| Description | Formula 1 | Formula 2 | Formula 3 | Formula 4 | Formula 5 |
|---|---|---|---|---|---|
| Water Deionized TNK | 45.00 | 45.00 | 45.00 | 45.00 | 45.00 |
| Polyquart Pro (22%) | 7.13 | 3.56 | 1.78 | 0.89 | 0.00 |
| Solution of tetrasodium salt of GLDA DRM | 0.75 | 0.75 | 0.75 | 0.75 | 0.75 |
| Palm Kernel Based Fatty Acid (Prifac 7908) | 18.00 | 18.79 | 19.18 | 19.37 | 19.57 |
| Potassium Hydroxide, 45% Liquid | 9.12 | 9.54 | 9.73 | 9.83 | 9.93 |
| Water Deionized TNK | 20.00 | 22.37 | 23.56 | 24.16 | 24.75 |

TABLE 32

| Examples | Formulation | Tap water by wt. (g) | Formula by wt (g) | 1% ES8804 in water by wt (g) | 1% EZ Clean 200 in water by wt (g) |
|---|---|---|---|---|---|
| 75 | Formula 1 | 222.30 | 2.70 | 0.00 | 0.00 |
| 76 | Formula 2 | 222.30 | 2.70 | 0.00 | 0.00 |
| 77 | Formula 3 | 222.30 | 2.70 | 0.00 | 0.00 |
| 78 | Formula 4 | 222.30 | 2.70 | 0.00 | 0.00 |
| Comp. 79 | Formula 5 | 222.30 | 2.70 | 0.00 | 0.00 |
| 80 | Formula 1 | 211.04 | 2.70 | 11.26 | 0.00 |
| 81 | Formula 2 | 211.04 | 2.70 | 11.26 | 0.00 |
| 82 | Formula 3 | 211.04 | 2.70 | 11.26 | 0.00 |
| 83 | Formula 4 | 211.04 | 2.70 | 11.26 | 0.00 |
| Comp. 84 | Formula 5 | 211.04 | 2.70 | 11.26 | 0.00 |
| 85 | Formula 1 | 216.25 | 2.70 | 0.00 | 6.05 |
| 86 | Formula 2 | 216.25 | 2.70 | 0.00 | 6.05 |
| 87 | Formula 3 | 216.25 | 2.70 | 0.00 | 6.05 |
| 88 | Formula 4 | 216.25 | 2.70 | 0.00 | 6.05 |
| Comp. 89 | Formula 5 | 216.25 | 2.70 | 0.00 | 6.05 |
| 90 | Water Control | | | | |

White grout coupons prepared as described above were treated with one application of each composition in table 32. The cleaner compositions were applied evenly over white grout coupons with an application rate of 2.6 g per coupon. The treated grout coupons were allowed to dry for at least 12 hours.

The cleaner treated grout coupons were soiled with two perpendicular passes of a foam brush coated with a black oily soil mixture. The soiled coupons were placed in a Gardner Abraser tray and submerged in 220 g of cleaning solution. Each of Examples 75-90 was used to treat at least one soiled coupon. A yellow 33PP1 DCV sponge from Reilly Foam Corporation was loaded into the Gardner abraser carriage with no extra loaded way and the sponge was passed over the coupon for 10 cycles. The coupon was then removed and air dried for 24 hours.

An image of each coupon was then scanned as a color "jpeg" image at 300 dpi. Fiji image analysis software was used to determine the median color values of the coupons. A higher color value indicates a white group coupon, meaning better cleaning performance. The results are set forth in the table 33 below.

TABLE 33

| Examples | Median Color Value |
|---|---|
| 75 | 255 |
| 76 | 254 |
| 77 | 215 |
| 78 | 219 |
| Comp. 79 | 204 |
| 80 | 239 |
| 81 | 254 |
| 82 | 249 |
| 83 | 255 |
| Comp. 84 | 231 |
| 85 | 241 |
| 86 | 252 |
| 87 | 253 |
| 88 | 228 |
| Comp. 89 | 202 |
| 90 | 165 |

A number of observations can be made from these results. The results demonstrate that the control (water) had the lowest cleaning efficiency. Of the compositions that included cleaner, Examples 81-83, including a combination of ES8804 and Polyquart Pro having its concentrations in the range of 3.56-0.89% wt in the formula, Examples 86-87 (EZ Clean 200 and Polyquart Pro having its concentrations in the range of 3.56-1.78% weight in the formula) and Examples 75-76 (Polyquart Pro only with its concentrations in the range of 7.13-3.56 wt % in the formula) had the highest overall cleaning efficiency. The Comparative Examples, 79, 84 and 89, not including Polyquart Pro did not perform as well as the same Examples with Polyquart Pro.

Additionally, Examples 82-83 containing ES8804 and 87-88 containing EZ Clean 200 had high cleaning efficiency despite having a reduced concentration of Polyquart Pro. In comparison, Examples 77-78 with reduced Polyquart Pro concentrations and no ES8804 or EZ Clean 200 had significantly lower cleaning efficiency. Furthermore the two Comparative Examples 84 and 89 containing no Polyquart Pro, but ES8804 or EZ Clean 200, had a reduced cleaning efficiency in contrast to their Polyquart Pro containing compositions. The results clearly indicated that the combination of Polyquart Pro and ES8804 or EZClean200, at certain component concentration ranges, can significantly improve the cleaning efficiency over the compositions containing Polyquart Pro only or the soil resistant agent only.

Moreover the experimental results also demonstrated that the addition of Polyquart Pro to a fatty acid based cleaner had significantly improved soil removal ability. (Examples 75-78 in contrast to Example 79). Similar result was obtained by comparing Example 84 to Example 79 that the addition of ES8804 to the fatty acid based cleaner significantly increased the cleaning efficiency.

Examples 91-97

The Examples set forth in table 34 below were prepared by mixing the identified ingredients in an overhead mixer at about 60° C. with the addition order from top to bottom as listed in the table. The palm kernel fatty acid was preheated to liquid phase prior to the mixing for easy addition. After the addition, the final product was further stirred for at least 30 minutes to complete the formulation preparation.

TABLE 34

| Ingredient | Description | Ex. 91 (wt %) | Ex. 92 (wt %) | Ex. 93 (wt %) | Ex. 94 (wt %) | Ex. 95 (wt %) | Ex. 96 (wt %) | Ex. 97 (wt %) |
|---|---|---|---|---|---|---|---|---|
| DI Water | Water Deionized TNK | 54.96% | 57.01% | 55.76% | 54.51% | 50.03% | 48.78% | 51.28% |
| Defoamer | 10% SE21 Solution | 7.50% | 7.50% | 7.50% | 7.50% | 7.50% | 7.50% | 7.50% |
| Soil resistant agent | Polyquart Ampho 149 (22%) | 0.92% | 0.92% | 0.92% | 0.92% | 0.92% | 0.92% | 0.92% |
| Chelating agent | Solution of tetrasodium salt of GLDA DRM (38%) | 0.75% | 0.75% | 0.75% | 0.75% | 0.75% | 0.75% | 0.75% |
| Surfactant | SXS, 96% | 0.00% | 0.00% | 1.25% | 2.50% | 1.25% | 2.50% | 0.00% |
| Fatty acid | Palm Kernel FA (Prifac 7908) | 19.37% | 4.00% | 4.00% | 4.00% | 4.84% | 4.84% | 4.84% |
| Fatty acid | Tall Oil FA | 0% | 15.04% | 15.04% | 15.04% | 18.21% | 18.21% | 18.21% |
| Alkalinity source | Potassium Hydroxide, 45% Liquid | 9.83% | 8.11% | 8.11% | 8.11% | 9.83% | 9.83% | 9.83% |
| Soil resistant agent | ES8804 | 4.17% | 4.17% | 4.17% | 4.17% | 4.17% | 4.17% | 4.17% |
| Slip resistant agent | Glucopon 425N | 2.50% | 2.50% | 2.50% | 2.50% | 2.50% | 2.50% | 2.50% |

The viscosity of each example was measured with Brookfield Programmable LVDV-II+ at ambient conditions. The viscosity results, spindle # and RPM used for the measurements are shown in Table 35 below.

TABLE 35

| Cleaner | Viscosity (cP) | Spindle # | RPM |
|---|---|---|---|
| Example 91 | 15.3 | LV1 | 100 |
| Example 92 | 432.1 | HA6 | 100 |
| Example 93 | 128.4 | HA6 | 100 |
| Example 94 | 38.4 | HA6 | 100 |
| Example 95 | 827.6 | HA6 | 100 |
| Example 96 | 202.5 | HA6 | 100 |
| Example 97 | Not measured due to high viscosity | | |

Soil resistance of each Example was evaluated by diluting the concentrate with tap water to form 1.0% by weight cleaner solution.

A white concrete grout coupon prepared as discussed in previous examples was divided into two equal sections. Each section was treated with 1.3 g of the diluted cleaner and allowed to dry overnight. One section was also treated with tap water as a control. A foam ring having an open center diameter of about 0.5 inch with a thickness of about 0.125 inch was adhered on the treated surface of each section. The open area of the ring center was filled with the red wine and the wine was maintained in full position to ensure that the wine was well contacted with the grout surface for 10 minutes. After 10 minutes, the wine inside the ring was removed with a dry paper towel, followed by a wet wiping of the grout surface after removing the ring. The tested area was then wiped with a dry paper towel.

The degree of stain of the grout was evaluated by Wb and L value measurement with the BYK Gardner SpectroGuide (45/0 gloss, Cat. No. 6801). A higher Wb or L value indicates less of a soil stain. A lower delta Wb or Delta L represents better stain resistance because the delta value was calculated by (non soiled value−soiled) value. The results are set forth in Table 36.

TABLE 36

| Example | Coupon # | non-soiled area L | non-soiled area Wb | soiled area L | soiled area Wb | delta (non-soiled − soiled) L | delta (non-soiled − soiled) Wb |
|---|---|---|---|---|---|---|---|
| Example 91 | 1 | 93.13 | 66.18 | 86.67 | 39.41 | 6.46 | 26.77 |
| Example 92 | 1 | 92.90 | 61.27 | 70.43 | 22.95 | 22.47 | 38.32 |
| Example 93 | 2 | 92.85 | 61.27 | 67.41 | 20.13 | 25.44 | 41.14 |
| Example 94 | 2 | 92.78 | 60.84 | 67.41 | 19.44 | 25.37 | 41.4 |
| Example 95 | 3 | 92.94 | 61.27 | 76.56 | 26.41 | 16.38 | 34.86 |
| Example 96 | 3 | 92.94 | 61.01 | 69.95 | 25.06 | 22.99 | 35.95 |
| Example 97 | 4 | 93.04 | 62.11 | 72.62 | 19.97 | 20.42 | 42.14 |
| Control (water) | 4 | 92.99 | 62.53 | 63.22 | 12.00 | 29.77 | 50.53 |

The above results indicate that the stain resistance performance of each of Examples 91-97 outperformed the water control.

The coefficient of friction (COF) of each Example was determined by preparing 1 wt % use solutions and coating VCT tiles (Standard Excelon Vinyl Composite tiles by Armstrong) with 1 g of each use solution three times with twenty minutes of drying in between coating applications. A tap water control was also applied to one tile.

After the last application had been applied, a dry time of at least one hour was allowed before measuring the COF of the test surface with the James Machine at about 77 F/50% RH. A total of four measurements (one measurement per side) was collected per test tile with the James Machine using a leather shoe. The Results are set forth in Table 37.

TABLE 37

| Example | COF 1 | COF 2 | COF 3 | COF 4 | Average | s.d. |
|---|---|---|---|---|---|---|
| Example 91 | 0.41 | 0.38 | 0.43 | 0.35 | 0.39 | 0.03 |
| Example 92 | 0.53 | 0.53 | 0.52 | 0.52 | 0.53 | 0.01 |
| Example 93 | 0.6 | 0.57 | 0.57 | 0.5 | 0.56 | 0.04 |
| Example 94 | 0.57 | 0.51 | 0.53 | 0.52 | 0.53 | 0.03 |
| Example 95 | 0.58 | 0.55 | 0.58 | 0.55 | 0.57 | 0.02 |
| Example 96 | 0.54 | 0.5 | 0.55 | 0.54 | 0.53 | 0.02 |
| Example 97 | 0.52 | 0.51 | 0.52 | 0.49 | 0.51 | 0.01 |
| Control (water) | 0.54 | 0.57 | 0.53 | 0.51 | 0.54 | 0.03 |

The results indicate that the surface treated with all the cleaners containing the combination of tall oil fatty acid and palm kernel (Examples 92 to 97) exhibited a COF comparable to the water treated surface and higher than the tile treated with the cleaner containing only the palm kernel fatty acid (Example 91).

Cleaning efficiency of each Example was measured by applying 1 wt % use solutions to white grout coupons. The use solutions were applied evenly over entire white grout coupons with an application rate of 2.6 g per coupon. Tap water was used as a control. The treated grout coupons were allowed to dry for at least 12 hours.

The cleaner treated grout coupons were soiled with two perpendicular passes of a foam brush coated with a black oily soil mixture. The soiled coupons were placed in a Gardner Abraser tray and submerged in 220 g of the same 1% test solution. A yellow 33PP1 DCV sponge from Reilly Foam Corporation was loaded into the Gardner abraser carriage with no extra loaded way and the sponge was passed over the coupon for 10 cycles. The coupon was then removed and air dried for 24 hours.

An image of each coupon was then scanned as a color "jpeg" image at 300 dpi. Fiji image analysis software was used to determine the median color values of the coupons. A higher color value indicates a whiter grout coupon, meaning better cleaning performance. The results are set forth in Table 38 below.

TABLE 38

| Example | Coupon | Median Color Value | Median Color Value ave. |
|---|---|---|---|
| Example 91 | 1 | 206 | 208.5 |
| Example 91 | 2 | 211 | |
| Example 92 | 3 | 215 | 220.5 |
| Example 92 | 4 | 226 | |
| Example 93 | 5 | 234 | 231.5 |
| Example 93 | 6 | 229 | |
| Example 94 | 7 | 219 | 224.5 |
| Example 94 | 8 | 230 | |
| Example 95 | 9 | 237 | 233.5 |
| Example 95 | 10 | 230 | |
| Example 96 | 11 | 226 | 223.5 |
| Example 96 | 12 | 221 | |
| Example 97 | 13 | 224 | 229.5 |
| Example 97 | 14 | 235 | |
| Control | 15 | 188 | 186.0 |
| Control | 16 | 184 | |

The results indicate that all the cleaners studied had a better cleaning efficacy than water.

Examples 98-109

Five formulas were prepared with various fatty acids as set forth in Table 39 below. All the concentrates were uniform except Tung oil fatty acid based (formula #5) which exhibited phase separation. Emery 629 Stripped Coconut Fatty Acid was used as the coconut fatty acid source, and Prifac 7908 was used as the palm kernel fatty acid source.

TABLE 39

| Description | MW | Formula #1 (wt %) | Formula #2 (wt %) | Formula #3 (wt %) | Formula #4 (wt %) | Formula #5 (wt %) |
|---|---|---|---|---|---|---|
| Water Deionized TNK | n/a | 87.95% | 85.99% | 87.95% | 85.92% | 85.95% |
| Coconut FA | 222 | 8.00% | 0% | 0% | 0% | 0% |
| Oleic Acid | 279 | 0% | 9.96% | 0% | 0% | 0% |
| Palm Kernel FA (Prifac 7908) | 224 | 0% | 0% | 8.00% | 0% | 0% |
| Tall Oil FA | 279 | 0% | 0% | 0% | 10.03% | 0% |
| Tung Oil FA | 278 | 0% | 0% | 0% | 0% | 10.00% |
| Potassium Hydroxide, 45% Liquid | n/a | 4.05% | 4.05% | 4.05% | 4.05% | 4.05% |

The formulas were then further diluted with tap water as outlined in Table 40. The Tung oil fatty acid based solution was shaken well followed by immediate dilution with tap water. Two sets of dilutions containing equal mole of fatty acid were prepared (Examples 98 to 102 for set 1 with 0.001 mol concentration of fatty acid and Example 103-107 for set 2 with 0.0005 mol concentration of fatty acid). Two additional solutions were prepared (Example 108-109) for a fatty acid weight % concentration comparison in contrast to Examples 98 and 99. All the dilutions were uniform except Tung oil fatty acid based (Examples 102 and 107).

TABLE 40

| Set | Example | Formula | FA Type | Water (g) | Formula (g) | fatty acid in dilution (mol) | fatty acid in dilution (g) |
|---|---|---|---|---|---|---|---|
| Set 1 | 98 | #1 | Palm Kernel | 38.85 | 1.15 | 0.0010 | 0.2304 |
| | 99 | #2 | Coconut | 38.85 | 1.15 | 0.0010 | 0.2304 |
| | 100 | #3 | Oleic | 38.85 | 1.15 | 0.0010 | 0.2868 |
| | 101 | #4 | Tall Oil | 38.85 | 1.15 | 0.0010 | 0.2889 |
| | 102 | #5 | Tung Oil | 38.85 | 1.15 | 0.0010 | 0.2880 |
| Set 2 | 103 | #1 | Palm Kernel | 39.42 | 0.58 | 0.0005 | 0.1152 |
| | 104 | #2 | Coconut | 39.42 | 0.58 | 0.0005 | 0.1152 |
| | 105 | #3 | Oleic | 39.42 | 0.58 | 0.0005 | 0.1434 |
| | 106 | #4 | Tall Oil | 39.42 | 0.58 | 0.0005 | 0.1444 |
| | 107 | #5 | Tung Oil | 39.42 | 0.58 | 0.0005 | 0.1440 |
| | 108 | #3 | Oleic | 39.08 | 0.92 | 0.0008 | 0.2304 |
| | 109 | #4 | Tall Oil | 39.08 | 0.92 | 0.0008 | 0.2304 |

The same COF procedure set forth for Examples 91-97 was utilized to test Examples 98-109 along with two untreated tiles as controls. The results are set forth in Table 41 below.

TABLE 41

| | Example | Formula | COF1 | COF2 | COF3 | COF4 | average |
|---|---|---|---|---|---|---|---|
| Set 1 | 98 | #1 | 0.43 | 0.44 | 0.42 | 0.42 | 0.4275 |
| | 99 | #2 | 0.44 | 0.44 | 0.43 | 0.41 | 0.43 |
| | 100 | #3 | 0.58 | 0.52 | 0.57 | 0.57 | 0.56 |
| | 101 | #4 | 0.61 | 0.57 | 0.64 | 0.68 | 0.625 |
| | 102 | #5 | 0.72 | 0.71 | 0.75 | 0.72 | 0.725 |
| Set 2 | 103 | #1 | 0.44 | 0.41 | 0.43 | 0.42 | 0.425 |
| | 104 | #2 | 0.42 | 0.41 | 0.44 | 0.42 | 0.4225 |
| | 105 | #3 | 0.55 | 0.57 | 0.53 | 0.5 | 0.5375 |
| | 106 | #4 | 0.59 | 0.59 | 0.58 | 0.59 | 0.5875 |
| | 107 | #5 | 0.72 | 0.72 | 0.72 | 0.79 | 0.7375 |
| | 108 | #3 | 0.56 | 0.58 | 0.56 | 0.56 | 0.565 |
| | 109 | #4 | 0.61 | 0.49 | 0.54 | 0.51 | 0.5375 |
| | Control 1 | none | 0.5 | 0.51 | 0.55 | 0.56 | 0.53 |
| | Control 2 | none | 0.53 | 0.52 | 0.51 | 0.57 | 0.5325 |

The results indicate that oleic fatty acid based soap solutions (Examples 100, 105 and 108) provided a COF comparable to non-treated surface. Surfaces treated with Tall oil fatty acid based solutions (Examples 101, 106 and 109) had a higher COF than the surface without any treatment, while coconut and palm kernel fatty acid based solutions (Examples 98, 99, 103, and 104) contributed to a lower COF than the bare tile controls.

Examples 110-114

Grout coupons were treated with aqueous solutions containing the additive set forth in Table 42 below. Sokalan CP9 was dissolved in DI H2O to form a 25.0% solids aqueous solution (Sokalan CP9 25%) prior to making the use solution for grout treatment. All of the use solutions for grout treatment were made by mixing 0.20 g of the additive with tap water to a total weight of 100.0 g. The grout was treated with 1.3 g per ½ coupon of the solution, and 2 applications were carried out for each condition. The red wine soiling procedure and the white concrete grout coupon preparations were the same as described in previous examples.

TABLE 42

| | Example | | | | |
|---|---|---|---|---|---|
| | 110 | 111 | 112 | 113 | 114 |
| Additive | Sokalan CP9 (25%) | ES8804 | Acusol 929 | ES8804 | Tap H2O |
| Coupon # | Coupon 1 | Coupon 1 | Coupon 2 | Coupon 2 | Coupon 3 |

Table 43 shows the Wb and L values of the Examples, with a Lower Delta value (non soiled–soiled) indicating better stain resistance.

TABLE 43

| Ex. | Wb non soiled | Wb soiled | Delta Wb | L non soiled | L soiled | Delta L |
|---|---|---|---|---|---|---|
| 110 | 57.33 | 24.61 | 32.72 | 91.96 | 85.19 | 6.77 |
| 111 | 57.08 | 23.86 | 33.22 | 91.88 | 85.17 | 6.71 |
| 112 | 67.12 | 8.78 | 58.34 | 92.85 | 60.90 | 31.89 |
| 113 | 57.92 | 26.06 | 31.86 | 92.09 | 86.11 | 5.98 |
| 114 | 62.10 | 11.08 | 51.02 | 92.55 | 65.12 | 27.43 |

The above results showed that Example 110 having Sokalan CP9 and Examples 111 and 112 including ES8804, significantly improved the red wine stain resistance when compared to the water treated coupon. This example demonstrates that the red wine soil resistance of a porous surface can be significantly improved with ES8804 and Sokalan CP9. This example also demonstrates that Sokalan CP9 is a commercially available substitute of ES8804 that would be expected to perform substantially similarly in floor treatment and cleaning applications.

Examples 115-120

Haze on Dark Tiles

Examples 115-120 investigated the amount of haze created on dark VCT tiles by fatty acid based soaps. The concentrate formulations set forth in table 44 below were used to prepare Examples 115-120. The formulations of table 44 were prepared by mixing the identified ingredients in an overhead mixer at about 60° C. with the addition order from top to bottom as listed in the table. The palm kernel fatty acid was preheated to liquid phase prior to the mixing for easy addition. After the addition, the final product was further stirred for at least 30 minutes to complete the formulation preparation.

TABLE 44

| Ingredient | Description | Ex. 115 (wt %) | Ex. 116 (wt %) | Ex. 117 (wt %) | Ex. 118 (wt %) | Ex. 119 (wt %) | Ex. 120 (wt %) |
|---|---|---|---|---|---|---|---|
| DI Water | Water Deionized TNK | 56.92% | 60.21% | 63.50% | 66.78% | 70.07% | 73.36% |
| Defoamer | SE21 Solution | 0.75% | 0.75% | 0.75% | 0.75% | 0.75% | 0.75% |
| Soil resistant agent | Polyquart Ampho 149 (22%) | 0.92% | 0.92% | 0.92% | 0.92% | 0.92% | 0.92% |
| Chelating agent | Solution of tetrasodium salt of GLDA DRM (38%) | 0.61% | 0.61% | 0.61% | 0.61% | 0.61% | 0.61% |
| Surfactant | SXS, 96% | 1.25% | 1.25% | 1.25% | 1.25% | 1.25% | 1.25% |
| Fatty acid | Palm Kernel FA (Prifac 7908) | 4.84% | 4.36% | 3.87% | 3.39% | 2.90% | 2.42% |
| Fatty acid | Tall Oil FA | 18.21% | 16.39% | 14.57% | 12.75% | 10.93% | 9.11% |
| Alkalinity source | Potassium Hydroxide, 45% Liquid | 9.83% | 8.85% | 7.86% | 6.88% | 5.90% | 4.92% |
| Soil resistant agent | ES8804 | 4.17% | 4.17% | 4.17% | 4.17% | 4.17% | 4.17% |
| Slip resistant agent | Glucopon 425N | 2.50% | 2.50% | 2.50% | 2.50% | 2.50% | 2.50% |

Cleaner solutions were formed by diluting the concentrate with tap water to form 1.0% by weight solutions. The haze properties of each cleaner solution were evaluated by applying the cleaner solutions to black VCT tiles (Standard Excelon Vinyl Composite tiles by Armstrong) that had been coated with five coats of MarketStar at 2000 sqft/gal (2.0 g/sqft per coat) that had been aged for more than three months.

Prior to the application of the cleaner solution, the coated tiles were prepared by wiping the tiles with distilled water to remove dust and particles. Each tile was divided into two equal sections. Each half was treated with 0.5 grams of the cleaner solution using a microfiber pad. The tiles were allowed to dry for 30 minutes between applications. A total of three applications of the cleaner solution were applied to each section.

After the third application was dry, the tiles were inspected for haze and placed into one of the following categories: very hazy, hazy, slightly hazy, and no haze. The haze results are in Table 45.

TABLE 45

| Example | Haze Rating |
|---|---|
| 115 | Very Hazy |
| 116 | Hazy |
| 117 | Slightly Hazy |
| 118 | Slightly Hazy |
| 119 | No Haze |
| 120 | No Haze |

The tiles became progressively hazier with increasing amounts of fatty acids. The formulas that had a rating of hazy, slightly hazy, or no haze were tested for cleaning properties.

Examples 116-119

Cleaning Properties

The cleaning properties of the fatty acid based soaps were then tested. White tiles supplied by Armstrong (12"×12" White Excelon Vinyl Composition Tile pattern 56830) were cut into 3"×10" tile coupons using a tile cutter. The tile coupons were wiped with distilled water to remove dust and particles and initial color readings of the white coupons were taken with a BYK Gardner SpectroGuide.

Presoil Cleaner Solution Application Procedure

About 0.2 grams of the 1.0% by weight cleaner solutions described in Table 44 above were applied to the tile coupons using a microfiber pad (1"×1", presoaked with the same cleaner solution). A total of six applications were applied with at least a 30 minute dry time between each application. Each cleaner solution was tested in duplicate on two separate tile coupons. Color readings of the tile coupons were taken 30 minutes after the sixth application for the "PreSoiled" values.

Soiling Procedure

Sieved AATCC carpet soil (0.40 g) was mixed with 200.00 g of D-13 101 Zytel Polymer Pellets in a plastic mixing bucket. The bucket was rotated on rollers at 60 rpm for 15 minutes. The sieved AATCC carpet soil was prepared as: Sieve TA2M/9 Carpet Soil (supplied by Textile Innovators, Rock Hill, S.C. 29732) with a 75 micron sieve. The D-13 101 Zytel Polymer Pellets was supplied by Textile Innovators, Rock Hill, S.C.

The tile coupons were soiled. The cleaner solution treated tile coupons were secured to the wall of a soiling drum having a diameter of 12" with the treated surface facing the inside of the drum. The tile coupons were taped to the soiling drum using ½" thick masking tape, allowing at least 1" of each coupon to be not covered by the tape. The soiled nylon pellet mixture was added to the soiling drum and the drum was sealed with a drum cover. The drum was rotated on rollers at a speed of 60 rpm in order to soil the tile coupons for a total of four hours. Color readings of the tile coupons were taken after the four hour period for the "Soiled" values.

Cleaning Procedure

The soiled tile coupons were next cleaned with the same cleaner solution as was used in the presoiling application procedure. A soiled tile coupon was placed into a snug fitting punch-out in a customized template, which was placed into the Gardner Abraser tray. The coupon was submerged in 220 g of the 1.0% by weight cleaner solutions as described in Table 44 in the Gardner Abraser tray for one minute. The Gardner Abraser was allowed to pass over the coupon for 4 cycles with a 1"×2¾"×3¾" yellow 33PP1 DC sponge supplied by Reilly Foam Corporation, which was loaded into the Gardner Abrader carriage with no extra loaded weight. The coupon was removed from the Gardner Abraser tray and allowed to dry at ambient conditions. Color readings of the dry tile coupons were taken for the "Cleaned" values.

The soiling procedure was repeated and the color readings of the tile coupons were taken after the four hour period for the "Resoiled" values. Following resoiling, the cleaning procedure was repeated and the color readings of the dry tile coupons were taken for the "Recleaned" values.

Color Measurements

Each color reading included measuring the L*, a*, and b* values with a BYK Gardner SpectroGuide, and averaging five readings. The L*, a*, and b* values were used to calculate the overall color change, ΔE, according to equation (1).

$$\Delta E = \sqrt{(L^*_0 - L^*_1)^2 + (a^*_0 - a^*_2)^2 + (b^*_0 - b^*_1)^2} \quad (1)$$

The first value in each of the parentheses (denoted with subscript 0) represents the initial L*, a* or b* values of the white coupons measured before the first presoiling process. The second value in the parentheses (denoted with subscript 1) represents the L*, a* or b* values of each state of soiling, cleaning, resoiling, and recleaning process. A lower Delta E value indicates lower overall color change compared to the initial state and thus a lower amount of soil.

Table 46 shows the Delta E results for the soiled, cleaned, resoiled, and recleaned tile coupons for cleaner solutions of Examples 116-119. The control used distilled water in place of the cleaner solution.

TABLE 46

| Example | ΔE(Soiled) | ΔE(Cleaned) | ΔE(Resoiled) | ΔE(Recleaned) |
|---------|------------|-------------|--------------|---------------|
| Control | 5.91       | 3.36        | 13.86        | 7.44          |
| 116     | 5.26       | 1.28        | 10.99        | 3.78          |
| 117     | 5.19       | 1.58        | 10.84        | 4.10          |
| 118     | 4.89       | 1.80        | 11.62        | 4.78          |
| 119     | 5.01       | 2.43        | 12.31        | 5.41          |

Delta E(cleaned) and DeltaE(recleaned) suggest the effectiveness of the cleaner solution to remove soil; Delta E(soiled) and Delta E(resoiled) suggest the soil repellency of the cleaner solutions. Examples 116-119, which were pre-treated with ES 8804, experienced about the same amount of color change following the soil step, while the control experienced a greater amount of color change, suggesting that Examples 116-119 were more effective at repelling or not attracting soil. Examples 116-119 as exhibited increased soil removability as compared to the control which was not pre-treated with ES 8804 as seen by the Delta E (cleaned) and Delta E (recleaned) values.

The present composition may be applied in any situation where it is desired to increase the glossiness and anti-slip properties of a surface. The present composition is safe to use on a daily or weekly basis and can be exposed to foot traffic about 15 minutes after the composition is applied onto a surface, about 5 minutes after application, about 1 minute after application, or almost immediately for autoscrubber applications. The present composition may be employed in a commercial detergent composition to protect coated and uncoated surfaces, such as marble, granite, terrazzo, concrete, dry shake, ceramic tiles, wood, laminate, linoleum, vinyl, cork, bamboo and rubber.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. A cleaning composition comprising:
    at least one fatty acid salt constituting up to about 50% by weight of the composition;
    at least one anti-slip agent constituting up to about 20% by weight of the composition;
    at least one copolymer of maleic and olefin constituting from about 4.17% by weight up to about 20% by weight of the composition; and
    water; and wherein the at least one copolymer of maleic and olefin has a molecular weight of from about 1,000 to about 20,000 g/mol and further including at least one amphoteric acrylic polymer, wherein the active ratio of the amphoteric acrylic copolymer to the maleic/olefin copolymer is from about 0.02:1 to 5:1.

2. The composition of claim 1 wherein the at least one fatty acid salt comprises a fatty acid neutralized with one or more alkalinity sources selected from the group consisting of: alkali metal or earth metal carbonates, alkali metal or earth metal hydroxides, and amines.

3. The composition of claim 1 wherein the at least one fatty acid salt comprises a fatty acid fully neutralized with one or more alkalinity sources.

4. The composition of claim 1 wherein the at least one anti-slip agent comprises an alkyl polyglucoside.

5. The composition of claim 1, further comprising at least one surfactant.

6. The composition of claim 1, further comprising at least one gloss-enhancing agent.

7. A cleaning composition comprising:
    at least one copolymer of maleic and olefin constituting from about 4.17% by weight up to about 20% by weight of the composition having a molecular weight of from about 1,000 to about 20,000 g/mol;
    at least one amphoteric acrylic polymer from about 0.1% by weight up to about 20% by weight of the composition;
    at least one fatty acid salt constituting up to about 50% by weight of the composition; and
    water.

8. The composition of claim 7 wherein the copolymer of maleic and olefin has a maleic/olefin molar ratio of from 1:2 to 2:1.

9. The composition of claim 7 wherein the active ratio of the amphoteric acrylic copolymer to the maleic/olefin copolymer is from about 0.02:1 to 5:1.

10. The composition of claim 7, and further comprising a gloss enhancing agent.

11. A method for cleaning a floor surface comprising:
applying a cleaning composition to the floor surface, the cleaning composition comprising:
   at least one fatty acid salt constituting up to about 50% by weight of the composition;
   at least one anti-slip agent constituting up to about 20% by weight of the composition;
   at least one copolymer of maleic and olefin constituting from about 4.17% by weight up to about 20% by weight of the composition;
   at least one amphoteric acrylic polymer from about 0.1% by weight up to about 20% by weight of the composition; and
   water.

12. The method of claim 11 further comprising a step of diluting the composition prior to the applying step.

13. The method of claim 11, wherein the floor surface is a stone surface.

14. The method of claim 13 wherein the stone surface is one of marble, concrete or terrazzo.

15. The method of claim 11, wherein the floor surface is a porous surface.

16. The method of claim 15, wherein the porous surface is one of concrete, terrazzo, dry shake or ceramic.

17. The method of claim 11, wherein the floor surface is a non-porous surface.

18. The method of claim 17, wherein the non-porous surface is one of vinyl, VCT, or linoleum.

19. The method of claim 11, wherein the flooring surface comprises a factory applied coating.

20. The method of claim 11, wherein the flooring surface comprises a job-site applied coating.

21. The method of claim 11, wherein the floor surface has a coefficient of friction that is at least as high after the composition is applied as prior to application of the composition.

22. The method of claim 11, wherein the floor surface has an increase in 60° gloss of at least about 20% after the composition is applied.

23. The method of claim 11, and further comprising the steps of:
   combining the at least one fatty acid salt provided in a first container with the at least one copolymer of maleic and olefin provided in a second container; and
   diluting the contents of the first container, the second container or the combination of the first and second containers with water prior to the applying step.

24. The method of claim 11, wherein the cleaning composition further comprises a gloss enhancing agent.

25. A kit comprising:
   an applicator;
   a removal agent for removing a plurality of soils from a surface;
   instructions for use of the kit;
   at least one fatty acid salt detergent;
   at least one copolymer of maleic and olefin having a molecular weight of from about 1,000 to about 20,000 g/mol and constituting from about 4.17% by weight up to about 20% by weight of the composition; and
   at least one amphoteric acrylic polymer from about 0.1% by weight up to about 20% by weight of the composition.

26. The kit of claim 25, further comprising:
   a first container for containing the at least one fatty acid salt detergent; and
   a second container for containing the at least one copolymer of maleic and olefin.

27. The kit of claim 25, further comprising an anti-slip agent.

28. The kit of claim 25, further comprising a gloss enhancing agent.

* * * * *